(12) United States Patent
Ikarashi et al.

(10) Patent No.: US 11,958,767 B2
(45) Date of Patent: Apr. 16, 2024

(54) MOLTEN GLASS CUTTING APPARATUS

(71) Applicant: NIHON TAISANBIN KOGYOU KABUSHIKI KAISHA, Ogaki (JP)

(72) Inventors: Mikio Ikarashi, Ogaki (JP); Toshinobu Hotta, Ogaki (JP)

(73) Assignee: NIHON TAISANBIN KOGYOU KABUSHIKI KAISHA, Gifu-ken (JP)

( * ) Notice: Subject to any disclaimer, the term of this patent is extended or adjusted under 35 U.S.C. 154(b) by 0 days.

(21) Appl. No.: 17/611,881

(22) PCT Filed: Jun. 10, 2021

(86) PCT No.: PCT/JP2021/022126
§ 371 (c)(1),
(2) Date: Nov. 16, 2021

(87) PCT Pub. No.: WO2022/249499
PCT Pub. Date: Dec. 1, 2022

(65) Prior Publication Data
US 2024/0043306 A1 Feb. 8, 2024

(30) Foreign Application Priority Data
May 25, 2021 (JP) .................................. 2021-087465

(51) Int. Cl.
*C03B 7/11* (2006.01)
(52) U.S. Cl.
CPC ...................................... *C03B 7/11* (2013.01)
(58) Field of Classification Search
CPC ....................................................... C03B 7/11
See application file for complete search history.

(56) References Cited

U.S. PATENT DOCUMENTS 4,036,094 A * 7/1977 Schaar ...................... C03B 7/11
83/623
4,174,647 A * 11/1979 Dahms ...................... C03B 7/10
83/617

(Continued)

FOREIGN PATENT DOCUMENTS

DE  202016005523 U1 * 1/2018
GB  2 174 693 A    11/1986

(Continued)

OTHER PUBLICATIONS

International Search Report for the Application No. PCT/JP2021/022126 dated Aug. 24, 2021.

(Continued)

*Primary Examiner* — Cynthia Szewczyk
(74) *Attorney, Agent, or Firm* — Cheng Law Group, PLLC

(57) ABSTRACT

A molten glass cutting apparatus comprises a first support portion, a second support portion, a restriction portion and an applying portion. The first support portion supports a shear blade so as to be rotatable around a first axis extending in the width direction of the shear blade. The second support portion supports the shear blade so as to be rotatable around a second axis extending in the length direction of the shear blade. The restriction portion restricts rotation of the shear blade provided with the first support portion around the first axis so that inclined portions of a projecting portions of each of a pair of the shear blades face each other when a pair of the shear blades are separated. The applying portion applies an elastic force around the first axis for pressing a pair of the shear blades against each other to the shear blade provided with the first support portion.

14 Claims, 21 Drawing Sheets

(56) References Cited

U.S. PATENT DOCUMENTS

| | | | |
|---|---|---|---|
| 4,396,411 A | | 8/1983 | Winzer |
| 4,450,741 A | | 5/1984 | Mumford |
| 4,467,431 A | * | 8/1984 | Gardner .................... C03B 7/10 |
| | | | 700/192 |
| 4,500,334 A | * | 2/1985 | Parkell ...................... C03B 7/10 |
| | | | 83/613 |
| 4,728,354 A | | 3/1988 | Vilk et al. |
| 5,772,718 A | * | 6/1998 | Flynn ......................... C03B 7/11 |
| | | | 83/16 |
| 2017/0121207 A1 | | 5/2017 | Tanaka et al. |

FOREIGN PATENT DOCUMENTS

| | | | | |
|---|---|---|---|---|
| JP | 58-199729 A | | 11/1983 | |
| JP | 59-13635 A | | 1/1984 | |
| JP | 60-246229 A | | 12/1985 | |
| JP | 61-270223 A | | 11/1986 | |
| JP | 03285832 A | * | 12/1991 | .............. C03B 7/10 |
| JP | 7-101733 A | | 4/1995 | |
| JP | 8-119638 A | | 5/1996 | |
| JP | 2015-182947 A | | 10/2015 | |

OTHER PUBLICATIONS

Written Opinion of the International Searching Authority (PCT/ISA/237) for Application No. PCT/JP2021/022126 dated Aug. 24, 2021.

* cited by examiner

MOLTEN GLASS CUTTING APPARATUS

CROSS-REFERENCE TO RELATED APPLICATIONS

This application is based on Japanese Patent Application No. 2021-087465 filed on May 25, 2021, and the patent is incorporated herein in its entirety.

TECHNICAL FIELD

The present invention relates to a molten glass cutting apparatus.

BACKGROUND ART

Conventionally, as described in Patent Literature 1, for example, a molten glass cutting apparatus including a pair of shear blades is known. In this apparatus, the molten glass falling from above is cut by a shearing force by cutting edges of a pair of shear blades. Gobs, which are pieces of cut molten glass, are used in the manufacture of glass products such as glass containers.

CITATION LIST

Patent Literature

[Patent Literature 1] Japanese Patent Laid-Open No. 7-101733

SUMMARY OF INVENTION

Technical Problem

In order to cut the molten glass satisfactorily, it is necessary to prevent a large gap from being formed between the cutting edge sides of a pair of shear blades in a state in which the tip parts of a pair of the shear blades overlap. For this purpose, a pair of the shear blades need to overlap while pressing each other, and the configuration to be described below is used.

In each of a pair of the shear blades, projecting portions projecting in the length direction of the shear blade are formed on the cutting edge side and on both sides in the width direction. The projecting portions of each of a pair of the shear blades are inclined in the direction opposite to the side where the tip parts overlap so as to serve as a guide when the tip parts of a pair of the shear blades overlap.

The base end part of one of a pair of the shear blades is attached to a first base portion. The other base end part of the other one of a pair of the shear blades is attached to the second base portion so as to be slightly offset in the vertical direction with respect to the shear blade attached to the first base portion. In a state in which a pair of the shear blades are separated from each other, the inclined portions of the projecting portions of a pair of the shear blades face each other.

When the first base portion and the second base portion are relatively moved toward each other, the inclined portions of the projecting portions of a pair of the shear blades come into contact with each other. In this case, since each projecting portion is inclined in the direction opposite to the side where the tip parts of a pair of the shear blades overlap, one of a pair of the shear blades rides on the upper surface of the other. In this case, a pair of the shear blades are in a state of being elastically deformed. As a result, a pair of the shear blades can be in a state of pressing each other while keeping the pressing force utilizing the elasticity of the shear blades within a proper range.

However, the shear blade may get distorted. For example, when the shear blade is manufactured by pressing, quenching of the pressed shear blade may generate a warp in the length direction and the width direction of the shear blade, causing the shear blade to get distorted. When the shear blade gets distorted, the pressing force utilizing the elasticity of the shear blades may deviate from the proper range. If the shear blade is used with the pressing force deviated from the proper range, the quality of the gob to be used for manufacturing the glass product may deteriorate and the life of the shear blade may shorten.

In addition, there is also a problem to be described below. When the shear blades wear due to use of the shear blades, the force of a pair of the shear blades pressing each other drops below the lower limit of the proper range, and the gap on the cutting edge side may increase. In this case, the molten glass cannot be cut satisfactorily, the quality of the gobs may deteriorate, and the life of each shear blade may shorten. In order to prevent the quality of the gobs from deteriorating and the life of each shear blade from shortening, it is necessary to keep the pressing force utilizing the elasticity of the shear blades within a proper range. For this reason, it is necessary to adjust the positional relationship of a pair of the shear blades in the vertical direction. However, this adjustment work is burdensome for the operator.

As described above, the cutting method that largely depends on the pressing force utilizing the elasticity of the shear blades can increase the burden on the operator. Therefore, there is still room for improvement in the technique for cutting molten glass.

The present invention has been made in view of the above circumstances, and an object of the present invention is to provide a molten glass cutting apparatus capable of preventing quality of gobs from deteriorating and lives of shear blades from shortening while reducing a burden on an operator.

Solution to Problem

The present invention is a molten glass cutting apparatus, including:
  a pair of shear blades;
  base portions each provided for a base end part of each of a pair of the shear blades;
  wherein a pair of the base portions are relatively moved toward each other so that tip parts of a pair of the shear blades overlap, and a shearing force by cutting edges of a pair of the shear blades cuts molten glass falling from above,
  each of a pair of the shear blades having projecting portions formed therein on both sides in a width direction and on a cutting edge side, the projecting portions each projecting in a length direction of the shear blade,
  the projecting portions of each of a pair of the shear blades being inclined in a direction opposite to a side where the tip parts overlap so that each projecting portions serves as a guide when the tip parts of a pair of the shear blades overlap by the relative movement toward each other;
  a first support portion provided at the base end part of one of a pair of the shear blades, the first support portion supporting the shear blade with respect to the base portion so as to be rotatable around a first axis extending in the width direction of the shear blade;

a second support portion provided at the base end part of one of a pair of the shear blades, the second support portion supporting the shear blade with respect to the base portion so as to be rotatable around a second axis extending in the length direction of the shear blade;

a restriction portion that restricts rotation of the shear blade provided with the first support portion around the first axis so that inclined portions of the projecting portions of each of a pair of the shear blades face each other when a pair of the shear blades are separated; and an applying portion that applies an elastic force around the first axis for pressing a pair of the shear blades against each other to the shear blade provided with the first support portion.

In the present invention, one of the base end parts of a pair of the shear blades is provided with a first support portion that rotatably supports the shear blade with respect to the base portion around the first axis extending in the width direction of the shear blade. In addition, the one of the base end parts of a pair of the shear blades is provided with a second support portion that rotatably supports the shear blade with respect to the base portion around the second axis extending in the length direction of the shear blade.

When a pair of the shear blades are separated from each other, the rotation of the shear blade provided with the first support portion around the first axis is restricted by the restriction portion so that the inclined portions of the projecting portions of a pair of the shear blades face each other. Therefore, when a pair of the base portions are relatively moved toward each other, the inclined portions of the projecting portions of a pair of the shear blades can be brought into contact with each other.

After that, while the shear blades provided with the first support portions rotate around the first axis, the tip parts of a pair of the shear blades overlap. In this overlapping state, the applying portions each apply an elastic force around the first axis for pressing a pair of the shear blades against each other to the shear blade provided with the first support portion. Therefore, for example, if there is a warp in the length direction of the shear blades, the force with which a pair of the shear blades press against each other can be within a proper range without being largely dependent on the pressing force utilizing the elasticity of the shear blades.

In addition, in a state in which the tip parts of a pair of the shear blades overlap, the shear blade provided with the second support portion is pressed by the shear blade provided with the first support portion to rotate around the second axis so as to place the respective cutting edge sides of a pair of shear blades along each other. Therefore, for example, if there is a warp in the width direction of the shear blades, the force with which a pair of the shear blades press against each other can be within a proper range without being largely dependent on the pressing force utilizing the elasticity of the shear blades.

In addition, according to the present invention, since the above-mentioned force is applied to the shear blade by the applying portion, the force with which the pair of shear blades press against each other can be maintained within a proper range if the shear blades wear.

According to the present invention described above, it is possible to reduce the burden on the operator required for the shear blade installation work and adjustment, and at the same time to prevent the quality of the gob from deteriorating and the life of the shear blade from shortening.

DESCRIPTION OF EMBODIMENTS

First Embodiment

A first embodiment embodying a molten glass cutting apparatus of the present invention is to be described below with reference to drawings. The molten glass cutting apparatus constitutes a glass container manufacturing apparatus 10 shown in FIG. 1. Note that some configurations are omitted to be shown in some drawings for convenience.

Figure 1:
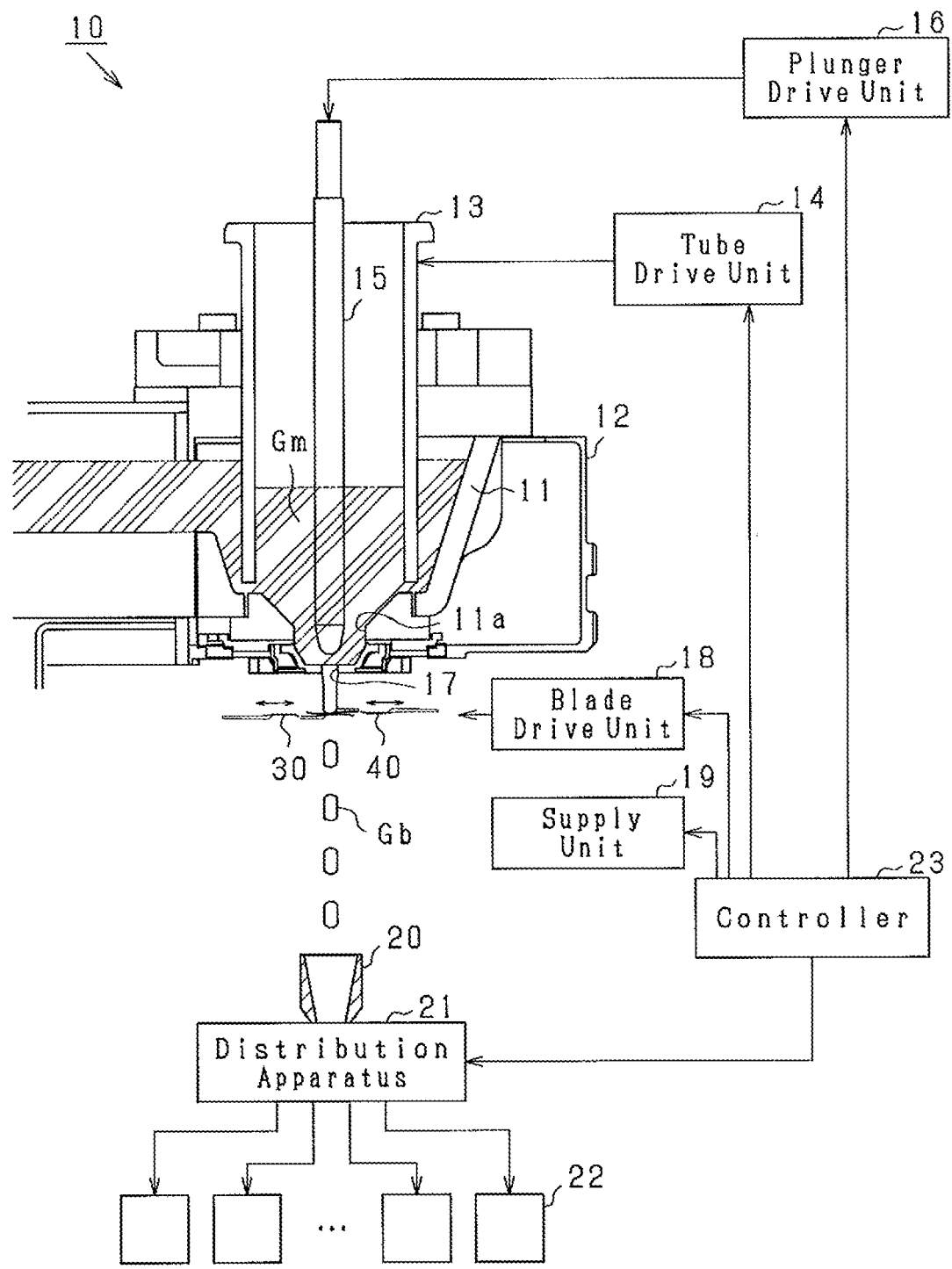
FIG. 1 is an overall configuration diagram of a glass container manufacturing apparatus according to a first embodiment.
Figure 2:
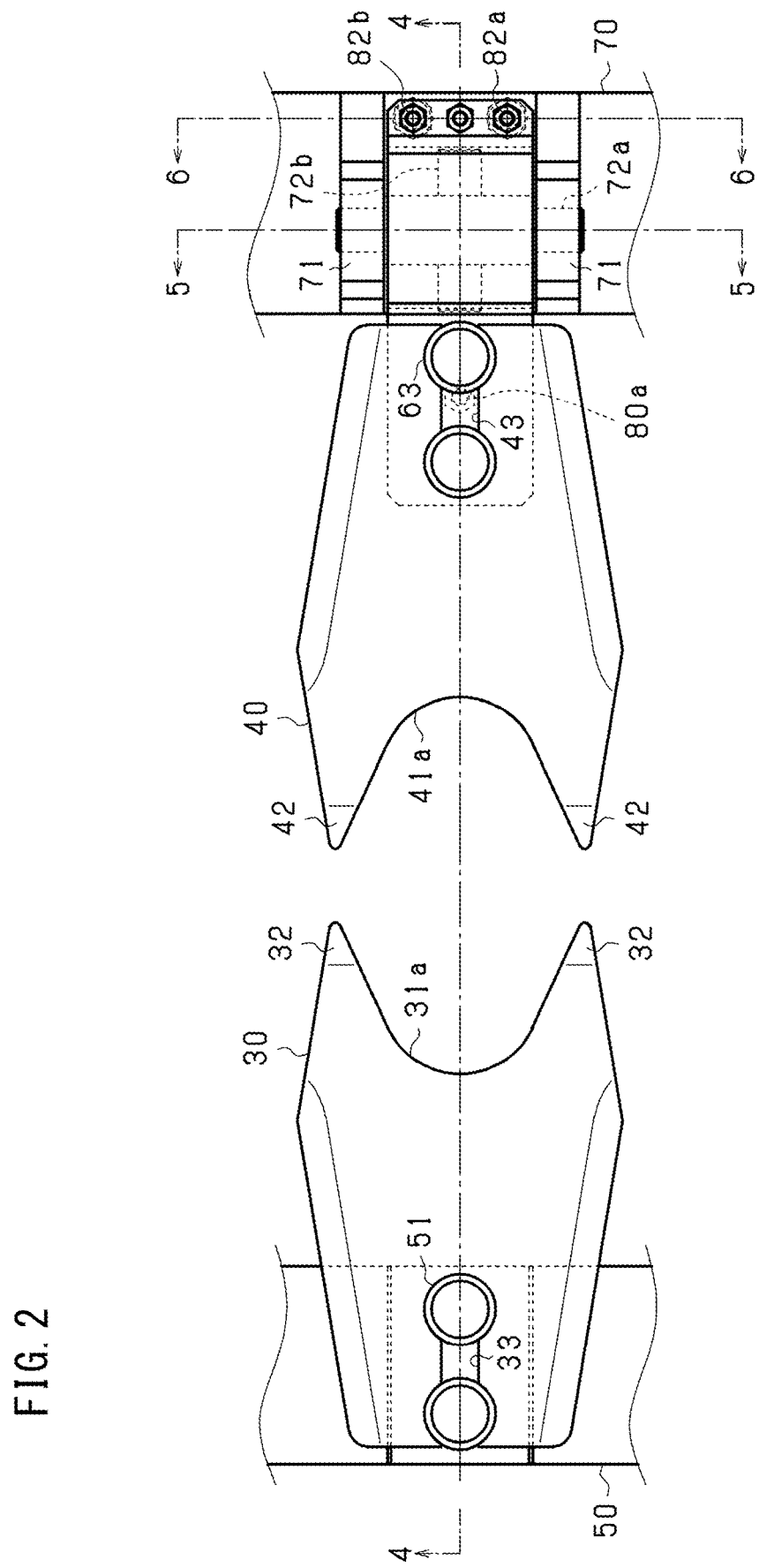
FIG. 2 is a plan view of a molten glass cutting apparatus.
Figure 3:
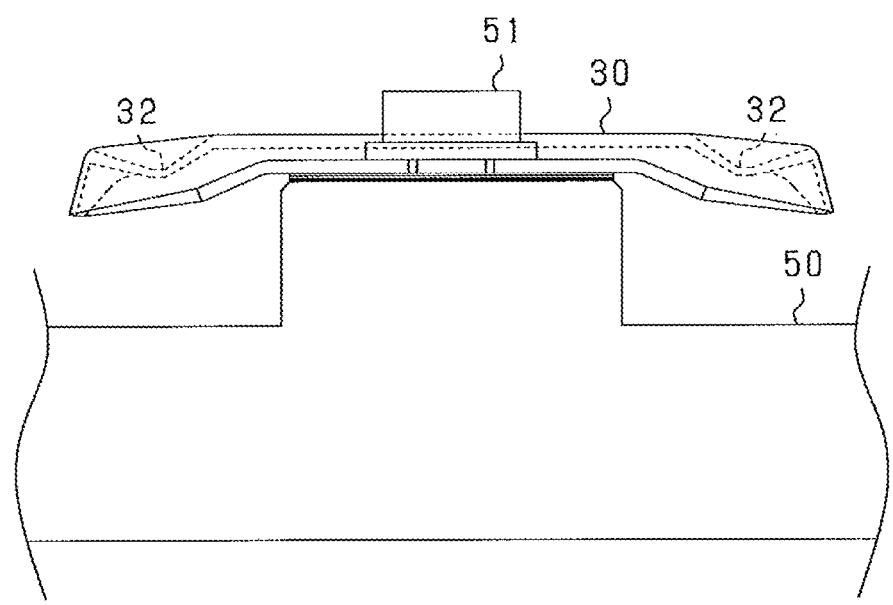
FIG. 3 is a view of a cutting apparatus as viewed from a base end side of a first shear blade.

As shown in FIG. 1, the manufacturing apparatus 10 includes a spout 11 and a spout case 12 that holds the spout 11. The spout 11 stores molten glass Gm supplied from a glass melting furnace (not shown).

The manufacturing apparatus 10 includes a clay tube 13 and a tube drive unit 14. The clay tube 13 has a tubular shape. The lower end of the clay tube 13 is immersed in the molten glass Gm in the spout 11. The clay tube 13 can be rotated around a central axis extending in the vertical direction by the tube drive unit 14. Thus, the molten glass Gm in the spout 11 is agitated. In addition, the vertical position of the clay tube 13 can be adjusted by the tube drive unit 14. The lower end part of the clay tube 13 and the bottom surface of the spout 11 form a passage for the molten glass Gm. Therefore, vertically changing the position of the clay tube 13 adjusts the amount of molten glass Gm flowing out to the outflow hole 11a side formed at the bottom part of the spout 11. A circular orifice 17 is formed at the bottom part of the spout 11.

The manufacturing apparatus 10 includes a plunger 15 and a plunger drive unit 16. The plunger drive unit 16 enables the plunger 15 to perform reciprocating motion in the vertical direction. When the plunger 15 is lowered to cause the tip part of the plunger 15 to enter the outflow hole 11a, the molten glass Gm is extruded to the outside of the spout 11 through the orifice 17. This causes the molten glass Gm to hang down in a columnar shape. On the other hand, when the plunger 15 is raised to separate the tip part of the plunger 15 from the outflow hole 11a, the hanging molten glass Gm is sucked into the orifice 17.

Note that FIG. 1 shows an example in which the manufacturing apparatus 10 includes one plunger 15, but the present invention is not limited to this, and the manufacturing apparatus 10 may include a plurality of plungers 15. In this case, the same number of orifices 17 as the number of plungers 15 only need to be formed at the bottom part of the spout 11.

The manufacturing apparatus 10 includes a molten glass cutting apparatus. The molten glass cutting apparatus includes a first shear blade 30, a second shear blade 40, and a blade drive unit 18. The first shear blade 30 and the second shear blade 40 are arranged below the orifice 17. The first shear blade 30 is arranged so as to face the second shear blade 40 in the horizontal direction. A servomotor or the like provided in the blade drive unit 18 enables the first shear blade 30 and the second shear blade 40 to perform reciprocating motion in the horizontal direction in synchronization with the vertical motion of the plunger 15. The molten glass Gm flowing down from the orifice 17 is cut by the shearing force between the cutting edge of the first shear blade 30 and the cutting edge of the second shear blade 40. The cut molten glass Gm becomes a rod-shaped gob Gb and falls by gravity.

The molten glass cutting apparatus includes a supply unit 19. The supply unit 19 supplies cooling water for cooling the first and second shear blades 30, 40 and the like to the first and second shear blades 30, 40 and the like.

The manufacturing apparatus 10 includes a funnel 20, a distribution apparatus 21, and a plurality of molds 22. The funnel 20 is arranged below the orifice 17 and has a funnel shape. The funnel 20 guides the fallen gob Gb to the distribution apparatus 21. The distribution apparatus 21 sequentially supplies the gobs Gb guided via the funnel 20 to each of the plurality of molds 22 via a gutter (not shown). In each mold 22, glass containers such as bottles are formed using the gobs Gb.

The manufacturing apparatus 10 includes a controller 23 as a control unit. The controller 23 includes a microcomputer, a memory, and the like, and controls the operations of the tube drive unit 14, the plunger drive unit 16, the blade drive unit 18, the supply unit 19, and the distribution apparatus 21.

Subsequently, the molten glass cutting apparatus is to be described in detail with reference to FIGS. 2 to 8.

The first shear blade 30 is a member made of a plate material. The first shear blade 30 is made of, for example, ceramic, titanium, or tungsten.

Figure 4:
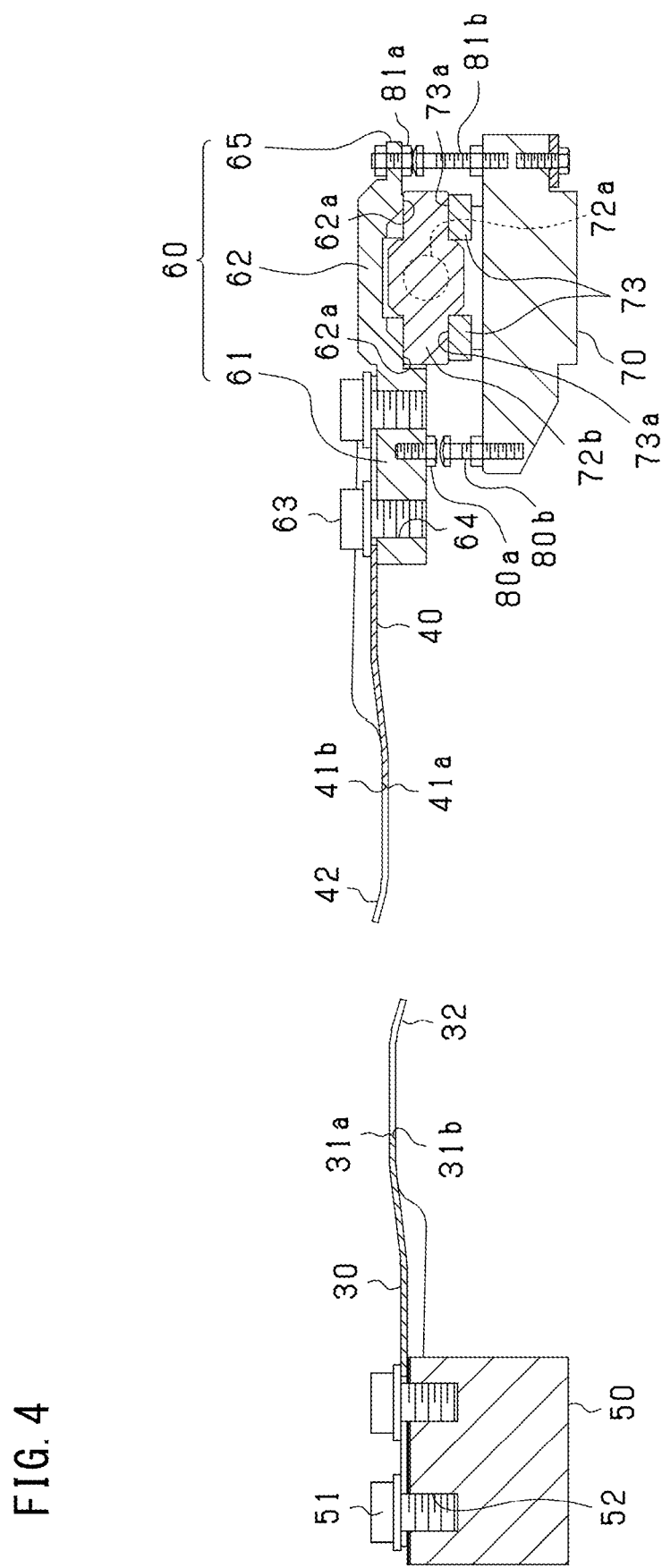
FIG. 4 is a cross-sectional view taken along a line 4-4 of FIG. 2.
Figure 5:
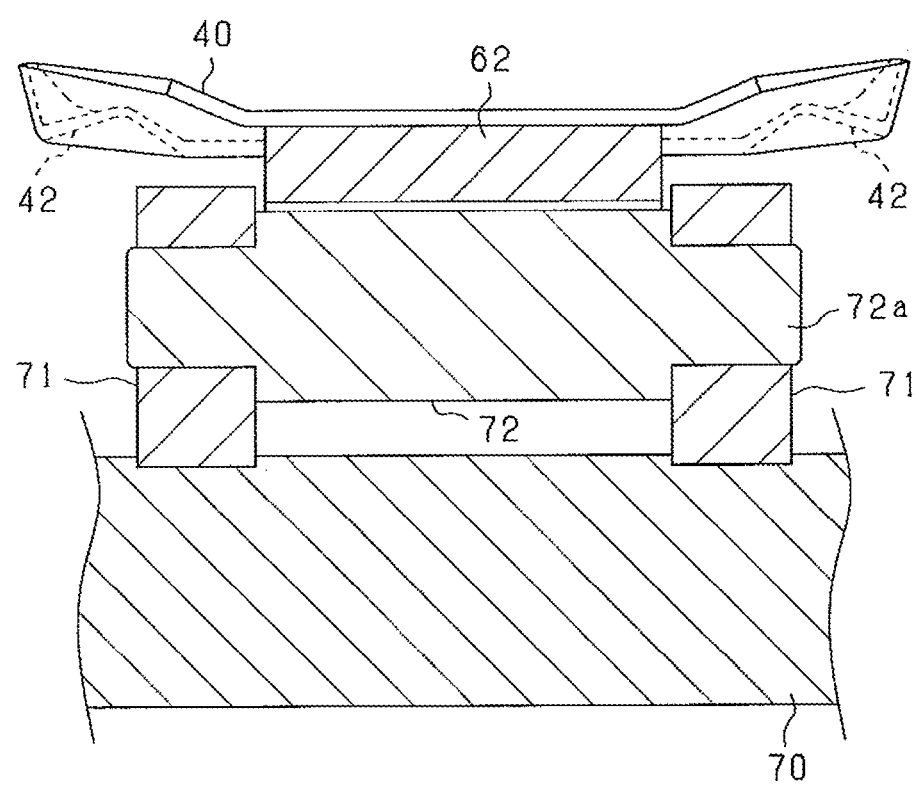
FIG. 5 is a cross-sectional view taken along a line 5-5 of FIG. 2.

As shown in FIG. 4, the cross-sectional shape of the tip part of the first shear blade 30 in the length direction is such that it projects upward. This forms a first blade surface 31b, which is an inclined surface, at the tip part of the first shear blade 30. The tip of the first blade surface 31b is the first cutting edge 31a. In the planar view of the first shear blade 30, the contour of the first cutting edge 31a retracts to the base end side of the first shear blade 30 toward the center in the width direction. As a result, in this embodiment, the contour of the first cutting edge 31a is U-shaped in the planar view of the first shear blade 30.

In the first shear blade 30, there are formed first projecting portions 32 projecting in the length direction of the first shear blade 30 on both sides in the width direction on the side of the first cutting edge 31a. Each first projecting portion 32 inclines obliquely downward. The width direction dimensions of the first projecting portion 32 decrease toward the tip in the length direction of the first shear blade 30.

The base end part of the first shear blade 30 is fixed to the first base portion 50. Specifically, the first shear blade 30 has formed therein a cutout 33 extending from the end on the base end side in the length direction toward the tip part side. The first base portion 50 has formed therein a bolt hole 52 through which a bolt 51 is inserted. In this embodiment, a plurality (two) of bolt holes 52 are formed in line in the length direction of the first shear blade 30. With the first shear blade 30 interposed between the seat surface of the bolt 51 and the first base portion 50, the bolt 51 is inserted into the cutout 33 and the bolt hole 52, and the bolt 51 is tightened. As a result, the first shear blade 30 is fixed to the first base portion 50.

The second shear blade 40 is a member made of a plate material. The second shear blade 40 is made of, for example, ceramic, titanium, or tungsten. In this embodiment, the second shear blade 40 is made of the same material as the first shear blade 30. Note that the second shear blade 40 may be made of a material different from that of the first shear blade 30.

As shown in FIG. 4, the cross-sectional shape of the tip part of the second shear blade 40 in the length direction is such that it projects downward. This forms a second blade surface 41b, which is an inclined surface, at the tip part of the second shear blade 40. The tip of the second blade surface 41b is the second cutting edge 41a. In the planar view of the second shear blade 40, the contour of the second cutting edge 41a retracts to the base end side of the second shear blade 40 toward the center in the width direction. As a result, in this embodiment, the contour of the second cutting edge 41a is U-shaped in the planar view of the second shear blade 40. The contours of the second cutting edge 41a and the first cutting edge 31a may be, for example, V-shaped instead of U-shaped.

In the second shear blade 40, there are formed second projecting portions 42 projecting in the length direction of the second shear blade 40 on both sides in the width direction on the side of the second cutting edge 41a. The second projecting portion 42 is inclined diagonally upward. The width direction dimensions of the second projecting portion 42 decrease toward the tip in the length direction of the second shear blade 43.

Each of the first shear blade 30 and the second shear blade 40 has a symmetrical shape with respect to the center in the width direction. Therefore, the contour of the first cutting edge 31a is symmetrical with respect to the center in the width direction. The contour of the second cutting edge 41a is also symmetrical with respect to the center in the width direction. In this embodiment, the first shear blade 30 has the same shape as the second shear blade 40.

The cutting apparatus includes a mounting portion 60. The mounting portion 60 includes a blade mounting portion 61. The upper surface of the blade mounting portion 61 is a flat surface, and the base end part of the second shear blade 40 is fixed to the flat surface. Specifically, a blade mounting portion 61 has formed therein a bolt hole 64 through which the bolt 63 is inserted. In this embodiment, a plurality (two) of bolt holes 64 are formed in line in the length direction of the second shear blade 40. On the other hand, the second shear blade 40 has formed therein a cutout 43 extending from the end on the base end side in the length direction toward the tip part side. With the second shear blade 40 interposed between the seat surface of the bolt 63 and the blade mounting portion 61, the bolt 63 is inserted into the cutout 43 and the bolt hole 64, and the bolt 63 is tightened. As a result, the second shear blade 40 is fixed to the blade mounting portion 61.

The mounting portion 60 includes a support mounting portion 62. The support mounting portion 62 is provided on the side of the blade mounting portion 61 opposite to the second shear blade 40 in the length direction of the second shear blade 40.

The cutting apparatus includes a second base portion 70, a shaft support portion 71, and a rotating member 72. The shaft support portion 71 is fixed to the second base portion 70 and extends upward from the second base portion 70. A pair of shaft support portions 71 are provided, and the shaft support portions 71 are arranged apart from each other in the width direction of the second shear blade 40.

The rotating member 72 includes a columnar first rotating shaft 72a and a second rotating shaft 72b extending from the center of the first rotating shaft 72a in the length direction to a direction orthogonal to the axial direction of the first rotating shaft 72a. Each shaft support portion 71 has formed therein a hole extending in the width direction of the second shear blade 40. Each of both ends of the first rotating shaft 72a is inserted into the hole formed in each shaft support portion 71. As a result, the rotating member 72 is rotatably supported by the second base portion 70 around the first axis extending in the width direction of the second shear blade 40. The central axis of the first rotating shaft 72a aligns with the first axis.

Figure 6:
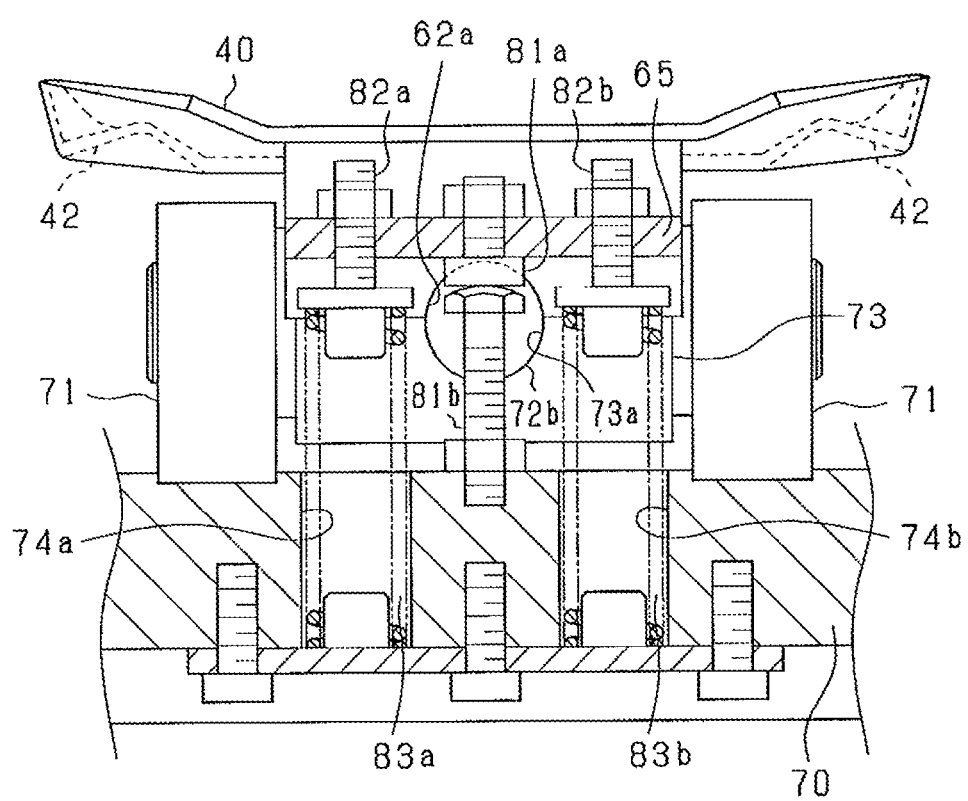
FIG. 6 is a cross-sectional view taken along a line 6-6 of FIG. 2.

As shown in FIGS. 4 and 6, a pair of concave portions 62a that are recessed in a semicircular shape are formed on the lower side of the support mounting portion 62. The receiving portions 73 fixed to the lower side of the support mounting portion 62 have formed therein concave portions 73a that are recessed in a semicircular shape. The concave portions 62a of the support mounting portion 62 and the concave portions 73a of the receiving portions 73 form bearing holes through which opposite ends of the second rotating shaft 72b are inserted. On the lower side of the support mounting portion 62, the space between a pair of the concave portions 62a arranged in the length direction is recessed above the concave portions 62a. This is to prevent the rotating member 72 from interfering with the lower surface of the support mounting portion 62 when the rotating member 72 rotates around a second axis.

The support mounting portion 62 and the receiving portion 73 described above allow the rotating member 72 to rotate around the second axis extending in the length direction of the second shear blade 40. As a result, the second shear blade 40 is rotatably supported around the second axis with respect to the second base portion 70. The central axis of the second rotating shaft 72b aligns with the second axis. Note that, in this embodiment, the mounting portion 60, the shaft support portion 71, and the first and second rotating shafts 72a and 72b correspond to a "first and second support portions". In addition, the shaft support portion 71 and the first and second rotating shafts 72a and 72b correspond to a "rotating portion".

The cutting apparatus includes a first upper stopper portion 80a and a first lower stopper portion 80b. The first upper stopper portion 80a is provided on the blade mounting portion 61 at its center of the lower surface of in the width direction of the second shear blade 40. The first upper stopper portion 80a projects downward from the lower surface of the blade mounting portion 61. In this embodiment, the first upper stopper portion 80a is formed from a bolt.

The first lower stopper portion 80b is provided on the second base portion 70 at a position thereof facing the first upper stopper portion 80a in the vertical direction. The first lower stopper portion 80b extends upward from the second base portion 70. In this embodiment, the first lower stopper portion 80b is formed from a bolt. Note that, in this embodiment, the first upper stopper portion 80a and the first lower stopper portion 80b correspond to a "first restriction portion".

Figure 7:
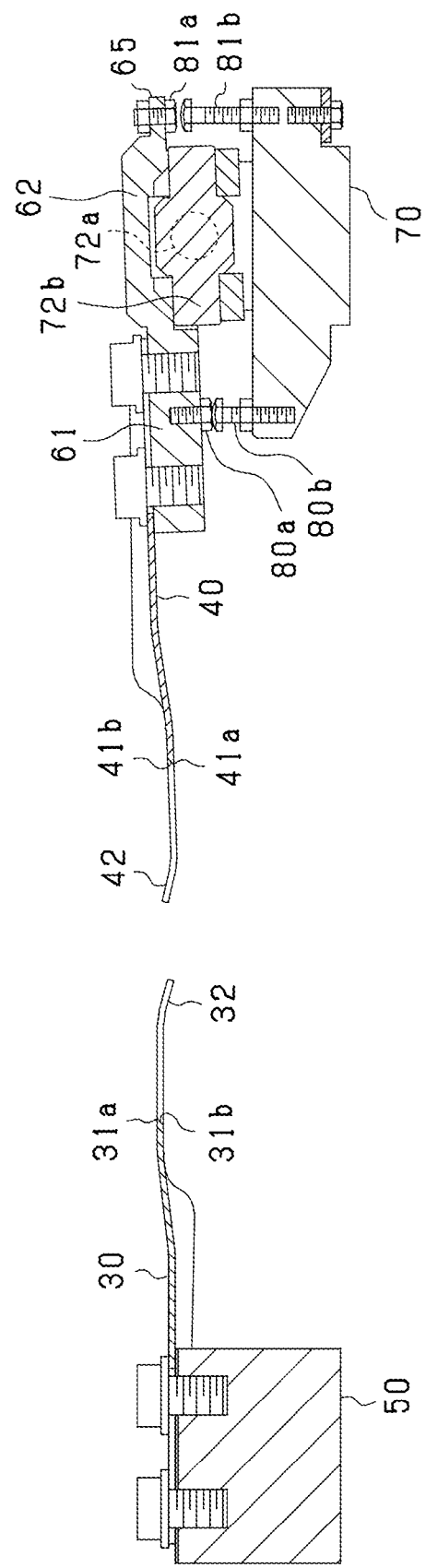
FIG. 7 is a diagram showing a state in which a second shear blade is in a forward leaning posture.

When the mounting portion 60 rotates in a specific direction around the first axis, the first upper stopper portion 80a comes into contact with the first lower stopper portion 80b, restricting the rotation of the mounting portion 60 in a specific direction around the first axis. In this case, as shown in FIG. 7, the second shear blade 40 is in a forward leaning posture, and the second projecting portion 42 is in a state of facing the first projecting portion 32 in the horizontal direction.

The mounting portion 60 includes an extending portion 65. The extending portion 65 is provided on the side of the support mounting portion 62 opposite to the blade mounting portion 61 in the length direction of the second shear blade 40.

As shown in FIGS. 4 and 6, the cutting apparatus includes a second upper stopper portion 81a and a second lower stopper portion 81b. The second upper stopper portion 81a is provided on the lower surface of the extending portion 65 at its center in the width direction of the second shear blade 40. The second upper stopper portion 81a projects downward from the lower surface of the extending portion 65. In this embodiment, the second upper stopper portion 81a is formed from a bolt.

The second lower stopper portion 81b is provided on the second base portion 70 at a position facing the second upper stopper portion 81a in the vertical direction. The second lower stopper portion 81b extends upward from the second base portion 70. In this embodiment, the second lower stopper portion 81b is formed from a bolt.

When the mounting portion 60 rotates in the direction opposite to the specific direction around the first axis, the second upper stopper portion 81a comes into contact with the second lower stopper portion 81b, restricting the rotation of the mounting portion 60 in the direction opposite to the specific direction around the first axis. In this case, as shown in FIG. 4, the second shear blade 40 is in the horizontal state. In this embodiment, the second upper stopper portion 81a and the second lower stopper portion 81b correspond to a "second restriction portion".

As shown in FIG. 6, the cutting apparatus includes a first adjusting bolt 82a, a second adjusting bolt 82b, a first spring 83a, and a second spring 83b. In this embodiment, the first spring 83a and the second spring 83b are compression coil springs, and the free length and the spring constant are set to the same. In this embodiment, the first and second springs 83a and 83b correspond to "first and second applying portions".

In a part of the extending portion 65 that is offset to one side in the width direction by a predetermined distance with respect to the center of the second shear blade 40 in the width direction, there is formed a through hole penetrating the extending portion 65 in the thickness direction. The first adjusting bolt 82a is inserted into the through hole, and the first adjusting bolt 82a is fixed with a nut. The head of the first adjusting bolt 82a projects downward from the lower surface of the extending portion 65.

In a part of the extending portion 65 that is offset to the other side in the width direction by the above predetermined distance with respect to the center of the second shear blade 40 in the width direction, there is formed a through hole penetrating the extending portion 65 in the thickness direction. The second adjusting bolt 82b is inserted into the through hole, and the second adjusting bolt 82b is fixed with a nut. The head of the second adjusting bolt 82b projects downward from the lower surface of the extending portion 65.

A first groove portion 74a extending downward from the upper surface of the second base portion 70 is formed in a part of the second base portion 70 that faces the head of the first adjustment bolt 82a in the vertical direction. A projection that restricts the horizontal movement of one end of the first spring 83a is formed on the bottom surface of the first groove portion 74a.

A second groove portion 74b extending downward from the upper surface of the second base portion 70 is formed in a part of the second base portion 70 that faces the head of the second adjusting bolt 82b in the vertical direction. A projection that restricts horizontal movement of one end of the second spring 83b is formed on the bottom surface of the second groove portion 74b.

The first adjusting bolt 82a is a flange bolt, the flange of the first adjusting bolt 82a is the seat surface of the first end of the first spring 83a, and the head of the first adjusting bolt 82a serves to restrict the horizontal movement of the first end of the first spring 83a. The bottom surface of the first groove portion 74a is the seat surface of the second end of the first spring 83a. The second adjusting bolt 82b is a flange bolt, the flange of the second adjusting bolt 82b is the seat surface of the first end of the second spring 83b, and the head of the second adjusting bolt 82b serves to restrict the horizontal movement of the first end of the second spring 83b. The bottom surface of the second groove portion 74b is the seat surface of the second end of the second spring 83b.

In a state in which the first upper stopper portion 80a is in contact with the first lower stopper portion 80b, the first ends of the first and second springs 83a and 83h are in contact with the flanges of the first; and second adjusting bolts 82a and 82b, and the second ends of the first and second springs 83a and 83b are in contact with the bottom surfaces of the first and second groove portions 74a and 74b. As a result, as the second shear blade 40 starts rotating around the first axis in the direction opposite to the specific direction from the state in which the first upper stopper portion 83a is in contact with the first lower stopper portion 80b, an elastic force for rotating the second shear blade 40 in the specific direction is quickly applied to the mounting portion 60. Here, in a state in which the first upper stopper portion 80a is in contact with the first lower stopper portion 80b, the first and second springs 83a and 83b are in a compressed state. As a result, it is possible to increase the elastic force for rotating the second shear blade 40 in a specific direction.

When the second upper stopper portion 81a is in contact with the second lower stopper portion 81b and the mounting portion 60 is in the horizontal state, the distance from the flange of the first adjusting bolt 82a to the bottom surface of the first groove portion 74a is equal to the distance from the flange of the second adjusting bolt 82b to the bottom surface of the second groove portion 74b. In other words, when the mounting portion 60 is not tilted in the width direction, the elastic forces applied to the mounting portions 60 by the first and second springs 83a and 83b are equal. Therefore, when the mounting portion 60 is tilted in the width direction, elastic force around the second axis for eliminating the tilt is applied to the mounting portion 60 from the first and second springs 83a and 83b.

Subsequently, description is to be made on operation of the first shear blade 30 and the second shear blade 40 when cutting the molten glass Gm.

Figure 9A:
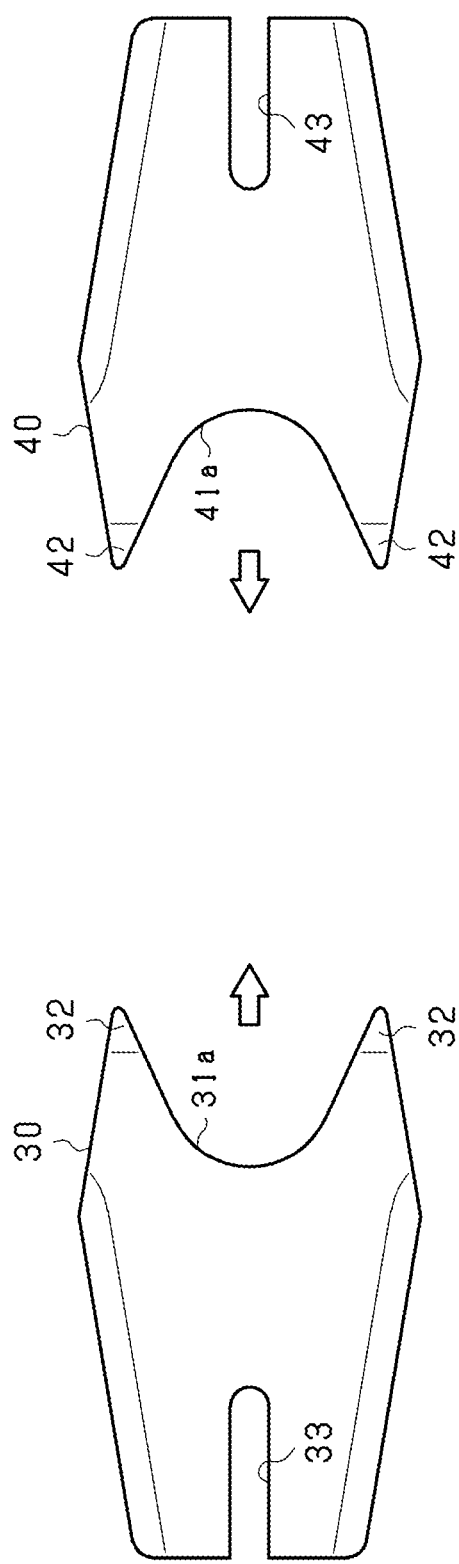
FIG. 9A is a diagram showing how the first and second shear blades move in the horizontal direction.

When the second shear blade 40 and the first shear blade 30 are separated from each other in the horizontal direction as shown in FIG. 9A, the rotation of the mounting portion 60 around the first axis is restricted by the first upper stopper portion 80a and the first lower stopper portion 80b so that the inclined portion of the first projecting portion 32 faces the inclined portion of the second projecting portion 42 in the horizontal direction as shown in FIG. 7. Therefore, moving the first base portion 50 and the second base portion 70 toward each other can bring the inclined portions of the first and second projecting portions 32 and 42 into contact with each other. The first and second projecting portions 32 and 42 serve as a guide when the tip parts of the first and second shear blades 30 and 40 overlap.

Here, in a state in which the rotation of the mounting portion 60 around the first axis is restricted by the first upper stopper portion 80a and the first lower stopper portion 80b, the first spring 833a and the second spring 83b are in a compressed state. Therefore, when the first base portion 50 and the second base portion 70 are brought close to each other, the second shear blade 40 can be maintained in a forward leaning posture. As a result, when the first base portion 50 and the second base portion 70 are brought close to each other, it is possible to prevent the second shear blade 40 from rotating in a specific direction around the first axis if some external force acts on the second shear blade 40.

Figure 9B:
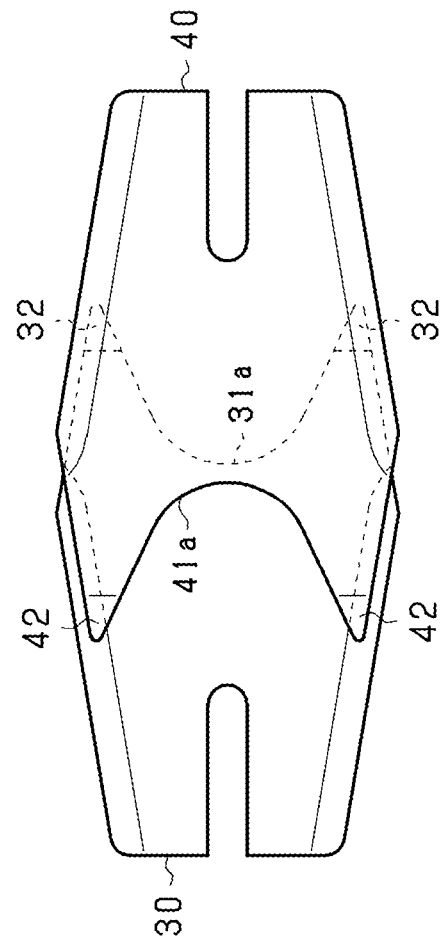
FIG. 9B is a diagram showing how the first and second shear blades move in the horizontal direction.
Figure 10:
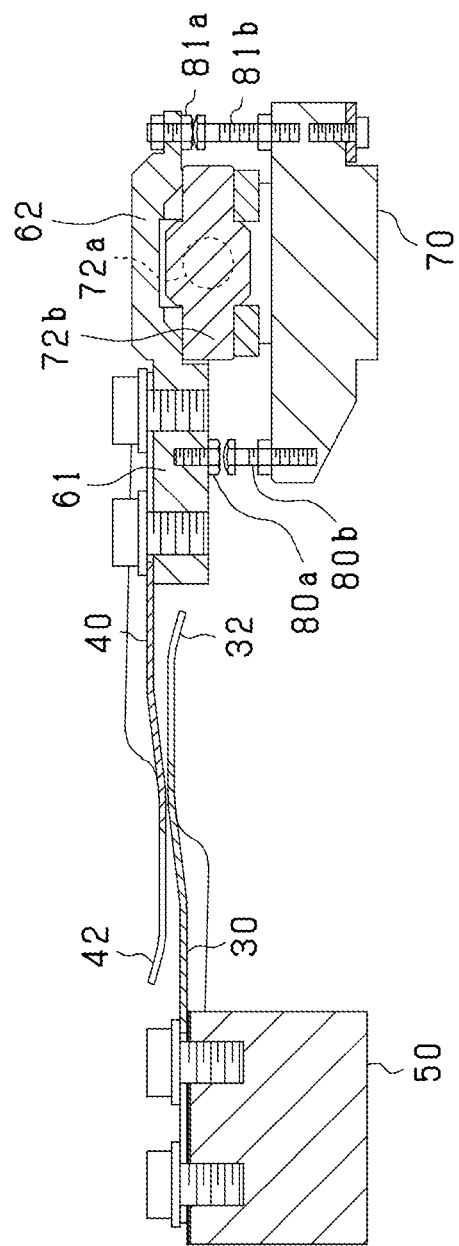
FIG. 10 is a diagram showing a state in which tip parts of the first and second shear blades overlap.
Figure 11:
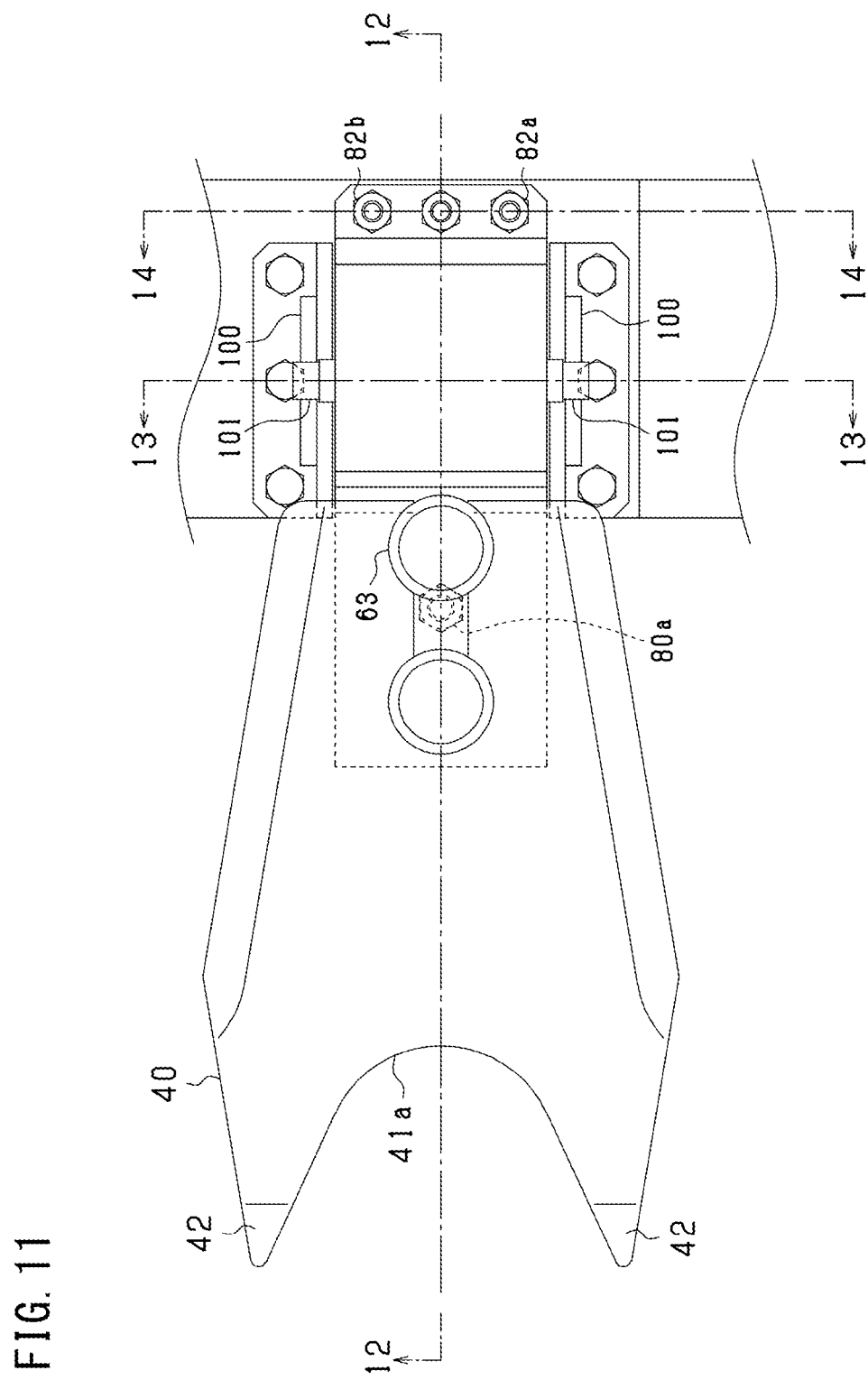
FIG. 11 is a plan view of a configuration on a second shear blade side of a cutting apparatus according to a second embodiment.
Figure 12:
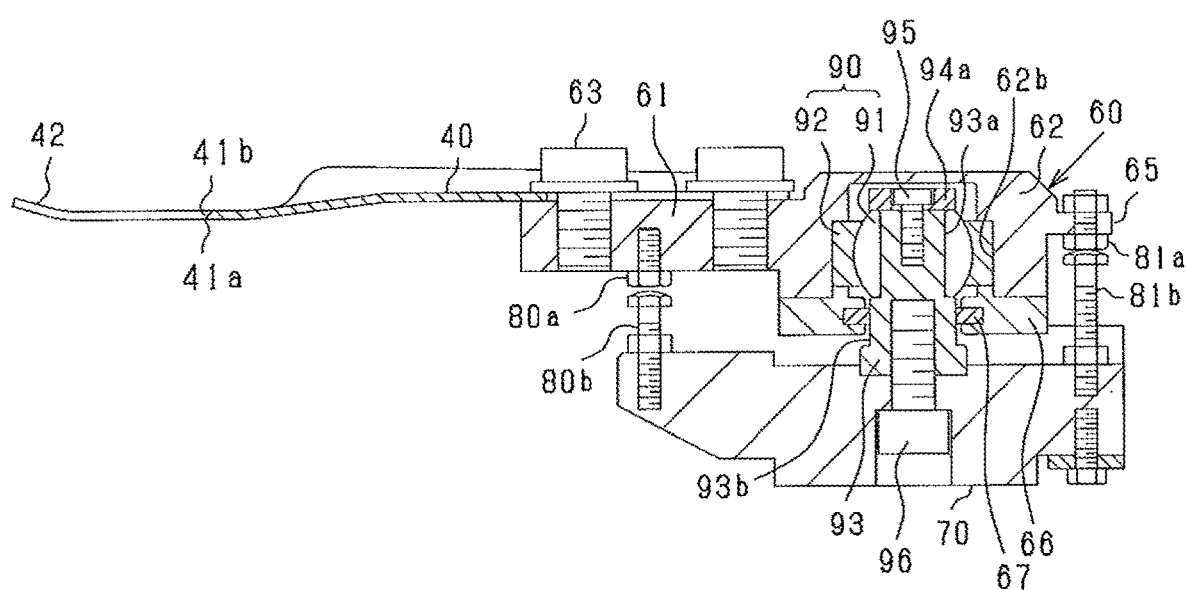
FIG. 12 is a cross-sectional view taken along a line 12-12 of FIG. 11.

After that, as the first base portion 50 and the second base portion 70 are brought closer to each other, the mounting portion 60 to which the second shear blade 40 is fixed rotates around the first axis, so that the lower surface of the second shear blade 40 and the upper surface of the first shear blade 30 are in contact with each other while the tip part of the first shear blade 30 and the tip part of the second shear blade 40 overlap as shown in FIGS. 9B and 10. In this case, since the first spring 83*a* and the second spring 83*b* are further compressed, a force for rotating the mounting portion 60 around the first axis in the direction opposite to the specific direction is applied to the mounting portion 60 from the first spring 83*a* and the second spring 83*b*. This causes the second shear blade 40 to press the first shear blade 30. Therefore, if the first and second shear blades 30 and 40 warp in the length direction, the force for pressing the second shear blade 40 against the first shear blade 30 can be within a proper range without being largely dependent on the pressing force utilizing the elasticity of the shear blades.

Figure 8A:
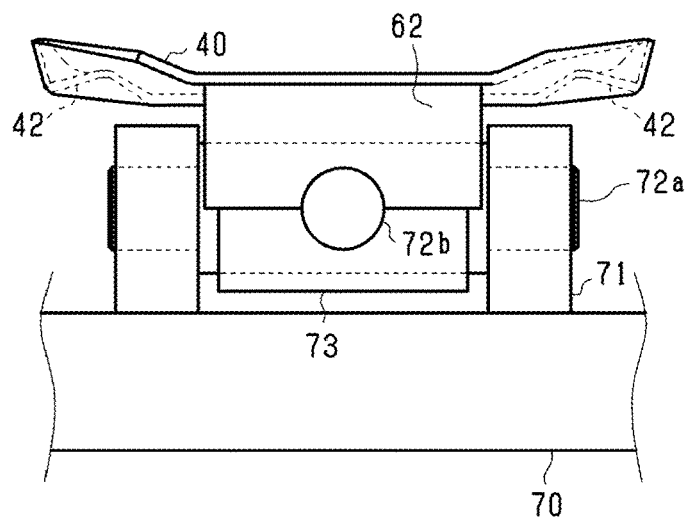
FIG. 8A is a diagram showing a configuration on the base end side of the second shear blade.
Figure 8B:
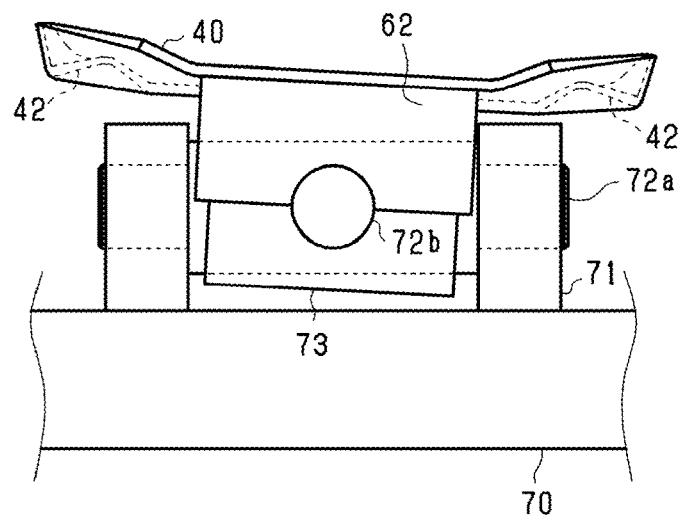
FIG. 8B is a diagram showing a configuration on the base end side of the second shear blade.
Figure 8C:
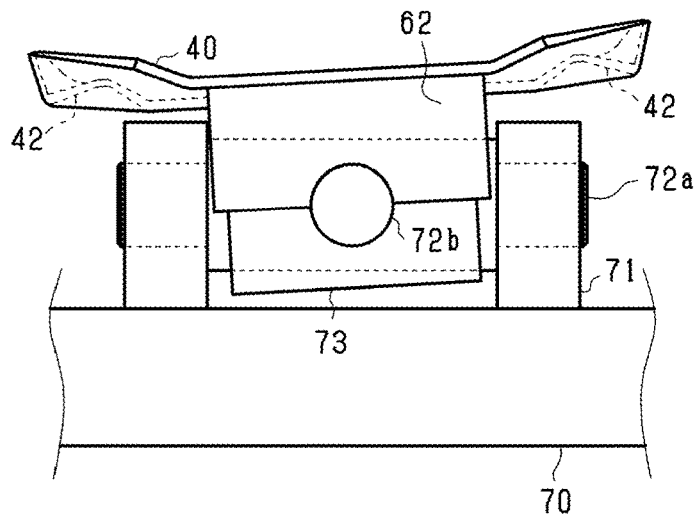
FIG. 8C is a diagram showing a configuration on the base end side of the second shear blade.

On the other hand, when the first and second shear blades 30 and 40 warp in the width direction and the tip part of the first shear blade 30 and the tip part of the second shear blade 40 overlap, the mounting portion 60 rotates around the second axis, and the second shear blade 40 tilts in the width direction as shown in FIG. 8B or FIG. 8C. In this case, elastic force around the second axis for eliminating the tilt is applied to the mounting portion 60 from the first and second springs 83*a* and 83*b* in this embodiment. Therefore, if the first and second shear blades 30 and 40 warp in the width direction, the sides of the first and second cutting edges 31*a* and 41*a* can be placed along each other without being largely dependent on the pressing force utilizing the elasticity of the shear blades. As a result, the force for pressing the second shear blade 40 against the first shear blade 30 can be made within a proper range.

In addition, according to this embodiment, if the first and second shear blades 30 and 40 wear, the force with which the first and second shear blades 30 and 40 press each other can be maintained within a proper range.

According to this embodiment described above, it is possible at the same time: to reduce the burden on the operator required for installation work and adjustment of the first and second shear blades 30 and 40; and to prevent the quality of the gob from deteriorating and the life of the first and second shear blades 30 and 40 from being shortened.

In order to reduce the wear of the first and second shear blades 30 and 40, it is preferable that the hardness of the first and second shear blades 30 and 40 be high. However, if the hardness is high, it is difficult to keep the pressing force utilizing the elasticity of the shear blades within a proper range. In this respect, according to this embodiment, if a shear blade having high hardness is used, the pressing force utilizing the elasticity of the shear blades could be kept within a proper range.

In this embodiment, the first and second springs 83*a* and 83*b* can apply: both the force for rotating the mounting portion 60 around the first axis so as to press the second shear blade 40 against the first shear blade 30; and the force for rotating the mounting portion 60 around the second axis so as to eliminate the tilt of the second shear blade 40 in the width direction. Thus, integrating the configurations for applying the pressing force on the second shear blade 40 side, in the first and second shear blades 30 and 40, can simplify the configuration of the molten glass cutting apparatus.

The inclined portion of the second projecting portion 42 and the inclined portion of the first projecting portion 32 come into contact with each other, so that the first shear blade 30 pushes up the second shear blade 40, rotating the second shear blade 40 in a specific direction around the first axis. In this case, the gap between the second shear blade 40 and the first shear blade 30 may increase, so that molten glass Gm may enter the gap between the second shear blade 40 and the first shear blade 30 when the molten glass Gm is cut. In this case, for example, the molten glass Gm that has entered rapidly cools and harden. As a result, the solidified glass may be broken due to the relative movement of the second shear blade 40 and the first shear blade 30. When the glass is broken, the broken glass pieces may be scattered around, or the scattered glass pieces may be mixed in the gob Gb.

In this respect, according to this embodiment, when the tip parts of the first and second shear blades 30 and 40 overlap, the rotation of the second shear blade 40 around the first axis is restricted by the second upper stopper portion 81*a* and the second lower stopper portion 81*b* so that the tip parts of the first and second shear blades 30 and 40 do not separate in the vertical direction. Therefore, it is possible to prevent a gap from being generated between the second shear blade 40 and the first shear blade 30 due to the contact between the inclined portions of the first and second projecting portions 32 and 42.

The first spring 83*a* and the second spring 83*b* are in a compressed state when the first upper stopper portion 80*a* is in contact with the first lower stopper portion 80*b*. Therefore, as the second shear blade 40 starts rotating around the first axis in the direction opposite to the specific direction, the elastic force of the first and second springs 83*a* and 83*b* for rotating the second shear blade 40 in a specific direction can be increased. As a result, it is possible to preferably prevent a gap from being generated between the second shear blade 40 and the first shear blade 30 due to the contact between the inclined portions of the first and second projecting portions 32 and 42.

A configuration including a mounting portion 60 for applying a pressing force, a rotating member 72, and springs 83*a* and 83*b* is applied to the second shear blade 40 side. In this case, the own weights of the second shear blade 40, the blade mounting portion 61, and the like can be used as a part of the pressing force against the first shear blade 30. As a result, it is possible to more preferably prevent a gap from being generated between the second shear blade 40 and the first shear blade 30 due to the contact between the inclined portions of the first and second projecting portions 32 and 42.

Second Embodiment

A second embodiment is to be described below with reference to the drawings, focusing on differences from the first embodiment. In this embodiment, a spherical plain bearing is used as a configuration for rotating the mounting portion around the first and second axes.

The configuration of the second shear blade 40 side of the cutting apparatus is to be described with reference to FIGS. 11 to 15. Note that, in FIGS. 11 to 15, some of the same configurations as, or the corresponding configurations to those described in the first embodiment are designated by the same reference numerals for convenience. In addition, some configurations are omitted to be shown in some drawings for convenience.

The cutting apparatus includes a bearing 90 and a support shaft 93. The bearing 90 is a spherical plain bearing, and includes an inner ring 91 having a spherical outer peripheral surface and an outer ring 92 having a concave surface corresponding to the outer peripheral surface thereof. The outer ring 92 has an annular shape.

A bearing hole is formed in the inner ring 91. The support shaft. 93 has a small diameter portion 93*a* on the first end side in the axial direction and a large diameter portion 93*b* on the portion adjacent to the small diameter portion 93*a* in the axial direction. The outer diameter dimension of the large diameter portion 93b is larger than the outer diameter dimension of the small diameter portion 93a.

A small diameter portion 93a is inserted into the bearing hole of the inner ring 91, and the small diameter portion 93a is in contact with the plate surface of the disk portion 94 having a larger outer diameter dimension than the small diameter portion 93a. A through hole is formed in the central part of the disk portion 94, and a bolt hole is formed in the first end of the support shaft 93. In a state in which the small diameter portion 93a and the inner ring 91 are in contact with the disk portion 94, the bolt 95 is inserted into the through hole of the disk portion 94 and the bolt hole of the support shaft 93, and the bolt 95 is tightened. As a result, the bearing 90 is fixed to the support shaft 93.

A bolt hole is formed on the second end side of the support shaft 93 in the axial direction. A through hole is formed in the second base portion 70. The bolt 96 is inserted into the through hole of the second base portion 70 and the bolt hole of the support shaft 93, and the bolt 96 is tightened. As a result, the support shaft 93 is fixed to the second base portion 70. As a result, the bearing 90 is fixed to the second base portion 73.

The lower surface side of the support mounting portion 62, which constitutes the mounting portion 60, is a recess, and the recess serves as a housing space for the bearing 90. The outer ring 92 is fixed to the peripheral wall portion 62b on the lower surface side of the support mounting portion 62. An annular lid portion 66 that covers the bearing 90 is fixed to the lower end of the support mounting portion 62. A through hole into which the support shaft 93 is inserted is formed in the central part of the lid portion 66.

The inner diameter side of the lid portion 66 and the large diameter portion 93b of the support shaft 93 are separated from each other. A disk-shaped seal member 67 is attached to the large diameter portion 93b. The seal member 67 is made of a material that is easily deformed, and is, for example, a felt seal. The outer edge of the seal member 67 is in contact with the lid portion 66. The seal member 67 prevents foreign matter from the outside or cooling water from the supply unit 19 from entering the housing space of the bearing 93 partitioned by the support mounting portion 62 and the lid portion 66, while allowing the rotational displacement of the mounting portion 60 with respect to the support shaft 93. Preventing foreign matter or cooling water from entering can prevent the malfunction of the bearing 90.

The cutting apparatus includes shaft support portions 100 and pins 101. The shaft support portions 100 are fixed to the second base portion 70 and extend upward from the second base portion 770. A pair of shaft support portions 100 are provided, and each shaft support portion 100 is arranged so as to be separated from each other in the width direction of the second shear blade 40. The shaft support portions 100 each have formed therein a guide groove 100a extending downward from the upper end. The lower end of the guide groove 100a has an arc shape.

Through holes 62c are respectively formed at parts of the peripheral wall portion 62b of the support mounting portion 62, which parts face each other in the width direction. A first end of each pin 101 is fixed to each of the parts of the outer ring 92 that face each other in the direction orthogonal to the axial direction. A second end side of each pin 101 is supported by each of the guide grooves 100a through the through hole 62c. The guide groove 100a restricts the movement of the pin 101 in the length direction of the second shear blade 40, while allowing the pin 101 to move in the vertical direction and to tilt in the width direction. Therefore, the mounting portion 60 is rotatably supported by the second base portion 70 around the first axis and around the second axis. In this embodiment, the bearing 90 and the support shaft 93 correspond to a "rotating portion".

According to this embodiment described above, similarly to the first embodiment, if the first and second shear blades 30 and 40 warp in the length direction, the force for pressing the second shear blade 40 against the first shear blade 30 can be within a proper range without being largely dependent on the pressing force utilizing the elasticity of the shear blades.

Figure 13A:
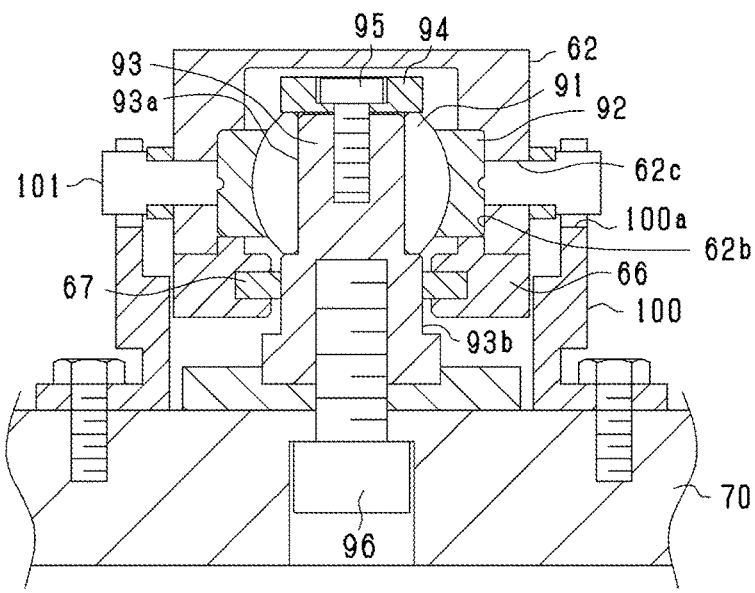
FIG. 13A is a cross-sectional view taken along a line 13-13 of FIG. 11.
Figure 13B:
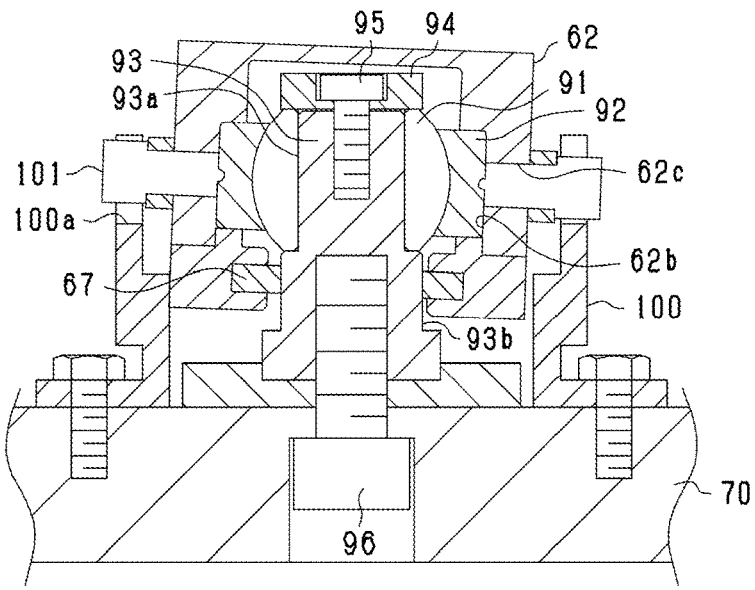
FIG. 13B is a cross-sectional view showing states of tilting.
Figure 13C:
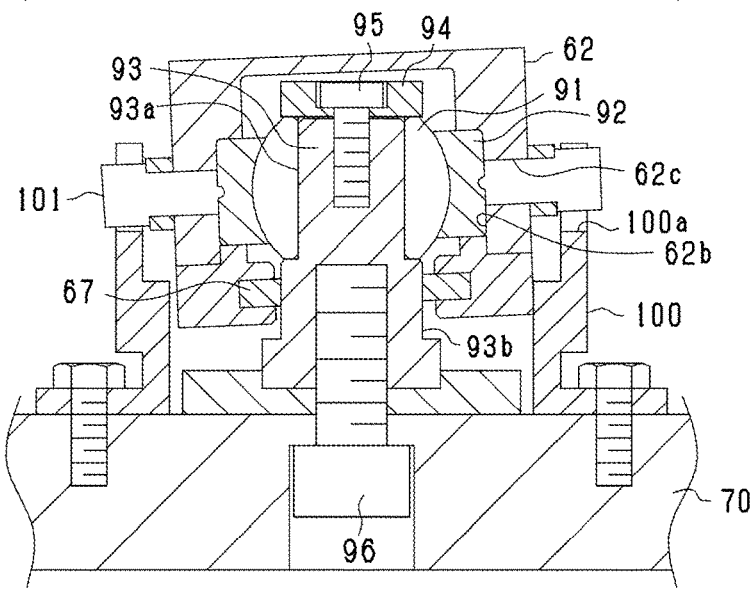
FIG. 13C is a cross-sectional view showing states of tilting.
Figure 14:
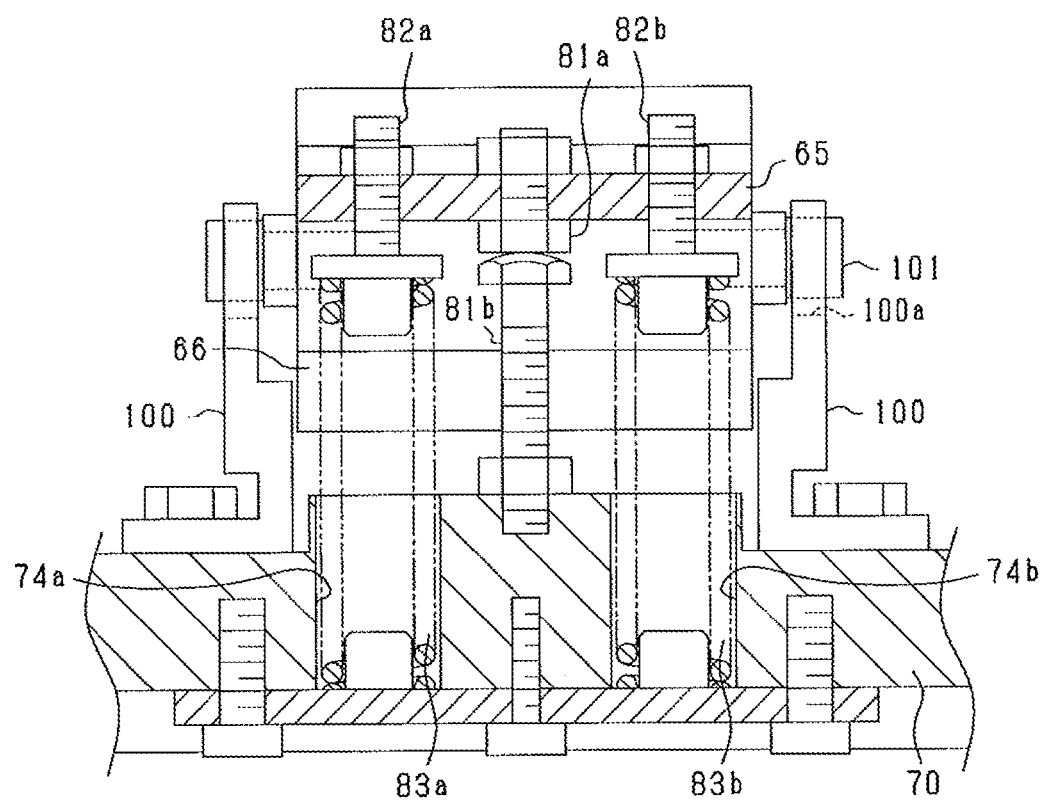
FIG. 14 is a cross-sectional view taken along a line 14-14 of FIG. 11.
Figure 15:
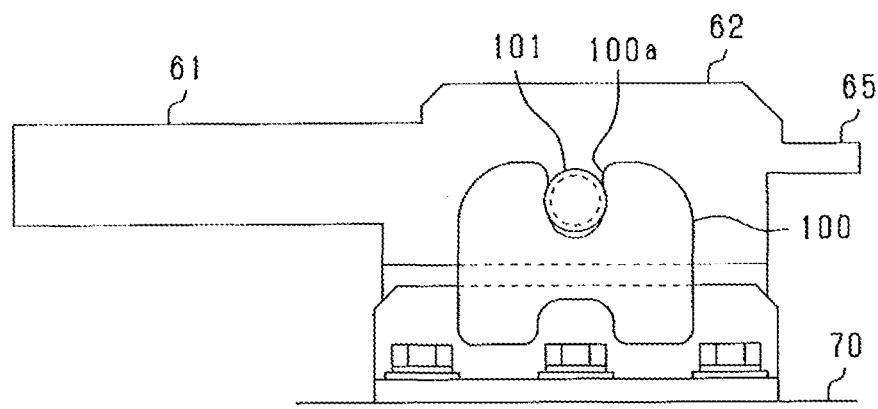
FIG. 15 is a side view of a configuration on the second shear blade side of the cutting apparatus.

When the first and second shear blades 30 and 40 warp in the width direction and the tip parts of the first and second shear blades 30 and 40 overlap, the mounting portion 60 rotates around the second axis and the second shear blade surface 41 tilts in the width direction as shown in FIG. 13B or FIG. 13C. Even in this case, according to this embodiment, a force for rotating the mounting portion 60 around the second axis so as to eliminate the tilt is applied to the mounting portion 60 from the first and second springs 83a and 83b, similarly to the first embodiment. Therefore, if the first and second shear blades 30 and 40 warp in the width direction, the force for pressing the second shear blade 40 against the first shear blade 30 can be within a proper range without being largely dependent on the pressing force utilizing the elasticity of the shear blades.

Third Embodiment

A third embodiment is to be described below with reference to the drawings, focusing on the differences from the first embodiment. In this embodiment, the number of springs provided in the configuration on the second shear blade 40 side of the cutting apparatus is changed from two to one.

Figure 16:
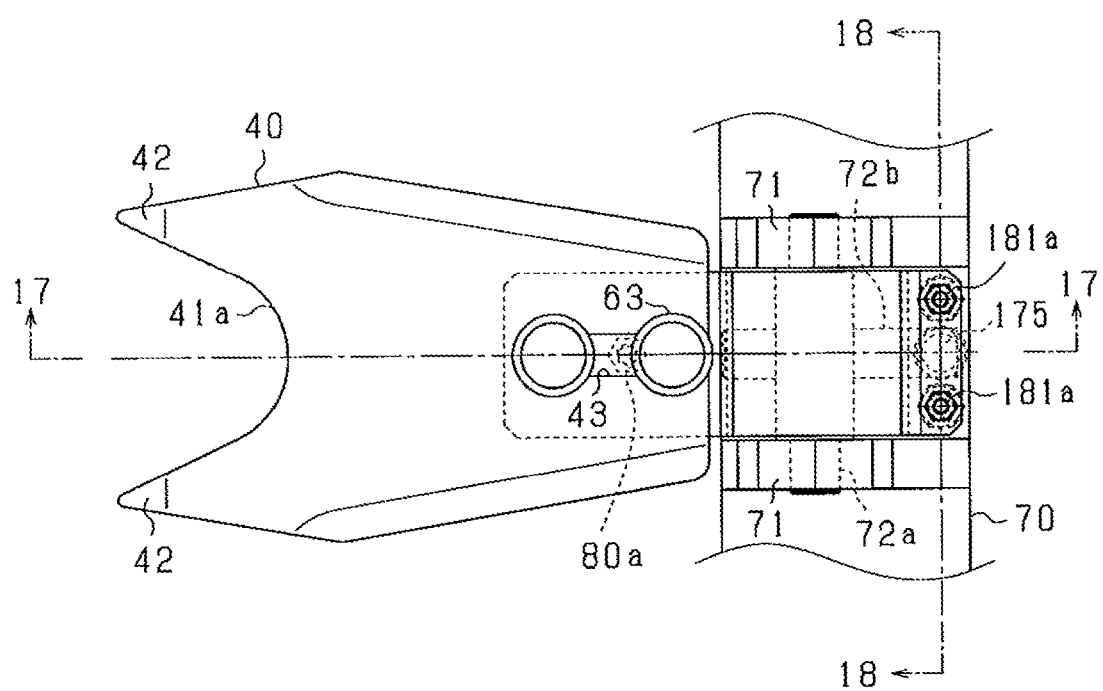
FIG. 16 is a plan view of a configuration on the second shear blade side of a cutting apparatus according to a third embodiment.
Figure 17:
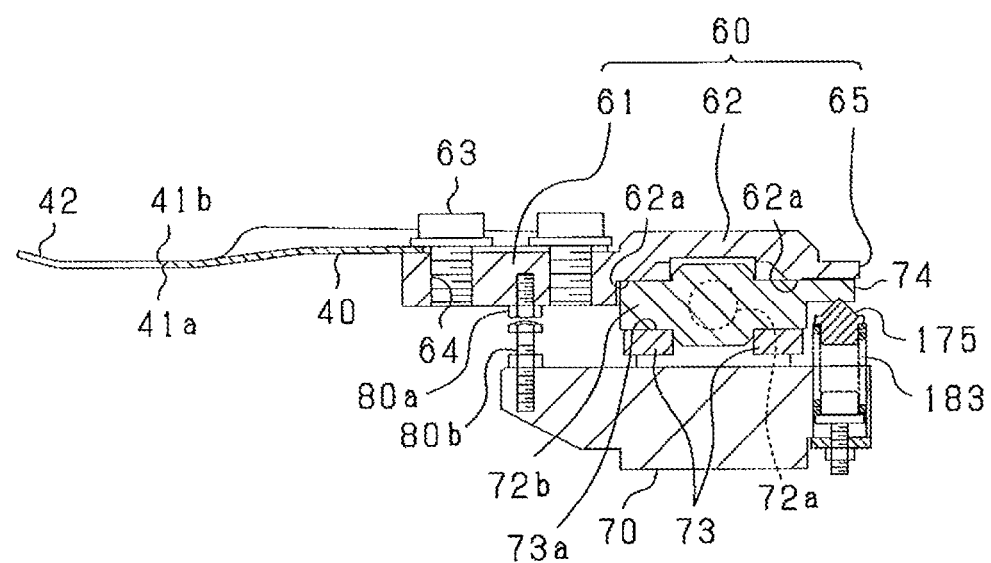
FIG. 17 is a cross-sectional view taken along a line 17-17 of FIG. 16.
Figure 18:
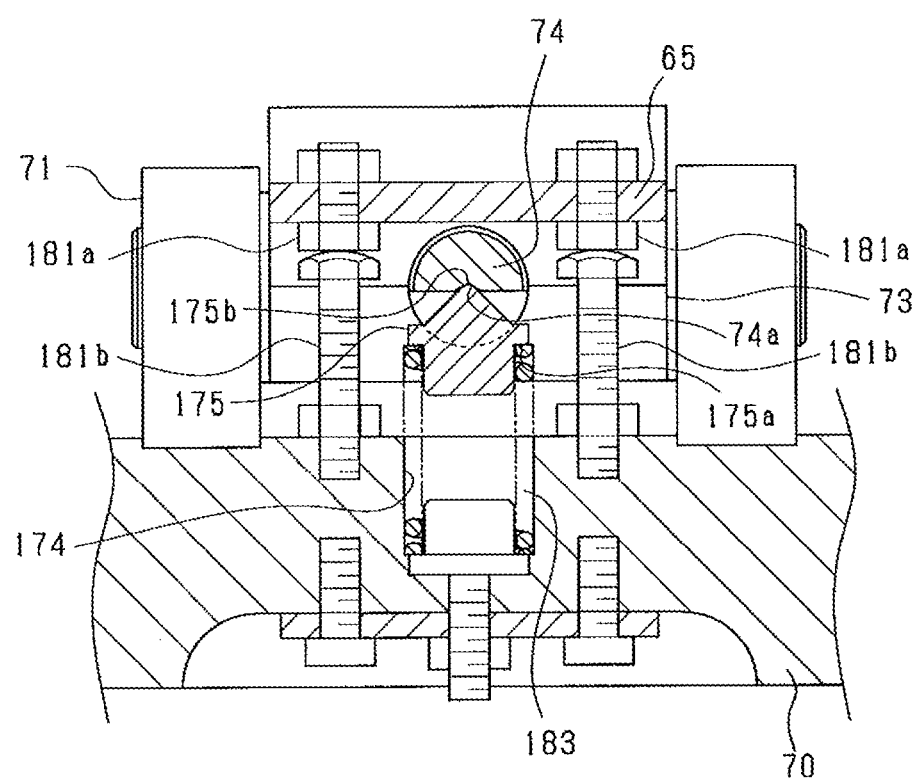
FIG. 18 is a cross-sectional view taken along a line 18-18 of FIG. 16.

The configuration of the second shear blade 40 side of the cutting apparatus is to be described with reference to FIGS. 16 to 18. Note that, in FIGS. 16 to 18, some of the same configurations as, or the corresponding configurations to those described in the first embodiment are designated by the same reference numerals for convenience. In addition, some configurations are omitted to be shown in some drawings for convenience.

The cutting apparatus includes a second upper stopper portion 181a and a second lower stopper portion 181b. The second upper stopper portions 181a are provided on parts of the lower surface of the extending portion 65, which parts are offset to the opposite sides to each other in the width direction by a predetermined distance with respect to the center of the second shear blade 40 in the width direction. The second upper stopper portion 181a projects downward from the lower surface of the extending portion 65. In this embodiment, the second upper stopper portions 181a are formed from bolts.

The second lower stopper portions 181b are provided at positions of the second base portion 70 that face the second upper stopper portions 181a in the vertical direction. The second lower stopper portion 181b extends upward from the second base portion 70. In this embodiment, the second lower stopper portions 181b are formed from bolts.

When the mounting portion 60 rotates in the specific direction around the first axis extending in the width direction of the second shear blade 40, the first upper stopper portion 80a comes into contact with the first lower stopper portion 80b. On the other hand, when the mounting portion 60 rotates in the direction opposite to the specific direction around the first axis, the second upper stopper portions 181a come into contact with the second lower stopper portions 181b, restricting the rotation of the mounting portion 60 in the direction opposite to the specific direction around the first axis. In this embodiment, the second upper stopper portion 181a and the second lower stopper portion 181b correspond to a "second restriction portion".

Incidentally, in a state in which each second upper stopper portion 181a is in contact with each second lower stopper portion 181b, the rotation of the mounting portion 60 is restricted around the second axis extending in the length direction of the second shear blade 40. Therefore, the contact position of the second lower stopper portion 181b with respect to the second upper stopper portion 181a only needs to be adjusted in the vertical direction to allow the mounting portion 60 to rotate around the second axis when the tip part of the first shear blade 30 and the tip part of the second shear blade 40 overlap.

In the second rotating shaft 72b, the side opposite to the second shear blade 40 in the axial direction is a contact portion 74 extending in the axial direction opposite to the second shear blade 40. The lower surface of the contact portion 74 is a flat surface.

The cutting apparatus includes a spring 183 and a spring receiving portion 175. In this embodiment, the spring 183 is a compression coil spring. In this embodiment, the spring 183 and the spring receiving portion 175 correspond to a "applying portion".

A groove portion 174 extending downward from the upper surface of the second base portion 70 is formed at the center of the second base portion 70 in the width direction of the second shear blade 40. A projection that restricts the horizontal movement of the lower end of the spring 183 is formed on the bottom surface of the groove portion 174.

The spring receiving portion 175 has formed therein a seat surface 175a with which the upper end of the spring 183 is in contact. A projection for restricting the horizontal movement of the upper end of the spring 183 is formed on the inside part of the seat surface 175a of the spring receiving portion 175. The upper tip part of the spring receiving portion 175 is a convex portion 175b, and the convex portion 175b has a conical shape. The convex portion 175b is in contact with the concave portion 74a formed in the center in the width direction of the lower surface of the contact portion 74. The outer diameter dimension of the convex portion 175b is smaller than the outer diameter dimension of the spring 183.

In a state in which the first upper stopper portion 80a is in contact with the first lower stopper portion 80b, the convex portion 175b of the spring receiving portion 175 is in contact with the concave portion 74a of the contact portion 74. As a result, as the second shear blade 40 starts rotating around the first axis in the direction opposite to the specific direction from the state in which the first upper stopper portion 83a is in contact with the first lower stopper portion 80b, an elastic force for rotating the second shear blade 40 in the specific direction is quickly applied to the mounting portion 60. In addition, the spring 183 is in a compressed state in a state in which the first upper stopper portion 80a is in contact with the first lower stopper portion 80b. As a result, it is possible to increase the elastic force for rotating the second shear blade 40 in a specific direction.

Subsequently, description is to be made on operation of the first shear blade 30 and the second shear blade 40 when cutting the molten glass Gm. The spring 183 is in a compressed state in a state in which the rotation of the mounting portion 60 around the first axis is restricted by the first upper stopper portion 80a and the first lower stopper portion 80b. Therefore, when the first base portion 50 and the second base portion 70 are brought close to each other, the second shear blade 40 can be maintained in a forward leaning posture.

After that, as the first base portion 50 and the second base portion 70 come closer to each other, the mounting portion 60 to which the second shear blade 40 is fixed rotates around the first axis, so that the lower surface of the second shear blade 40 and the upper surface of the first shear blade 30 are in contact with each other while the tip part of the first shear blade 30 and the tip part of the second shear blade 40 overlap. In this case, since the spring 183 is further compressed, a force for rotating the mounting portion 60 around the first axis in the direction opposite to the specific direction is applied to the mounting portion 60 from the spring 183. This causes the second shear blade 40 to press the first shear blade 30. Therefore, if the first and second shear blades 30 and 40 warp in the length direction, the force for pressing the second shear blade 40 against the first shear blade 30 can be within a proper range without being largely dependent on the pressing force utilizing the elasticity of the shear blades.

On the other hand, when the first and second shear blades 30 and 40 warp in the width direction and the tip part of the first shear blade 30 and the tip part of the second shear blade 40 overlap, the mounting portion 60 rotates around the second axis, and the second shear blade 40 tilts in the width direction. Therefore, if the first and second shear blades 30 and 40 warp in the width direction, the sides of the first and second cutting edges 31a and 41a can be placed along each other without being largely dependent on the pressing force utilizing the elasticity of the shear blades.

The convex portion 175b of the spring receiving portion 175 is in contact with the concave portion 74a formed in the center in the width direction of the lower surface of the contact portion 74. Therefore, when the mounting portion 60 rotates around the second axis, it is possible to prevent the convex portion 175b of the spring receiving portion 175 from being displaced from the center in the width direction of the lower surface of the contact portion 74. As a result, it is possible to prevent the spring 183 from bending, so that it is possible to prevent the load of the spring 183 from decreasing and the life of the spring 183 from shortening.

Fourth Embodiment

A fourth embodiment is to be described below with reference to the drawings, focusing on the differences from the second embodiment. In this embodiment, the number of springs provided in the configuration on the second shear blade 40 side of the cutting apparatus is changed from two to one.

Figure 19:
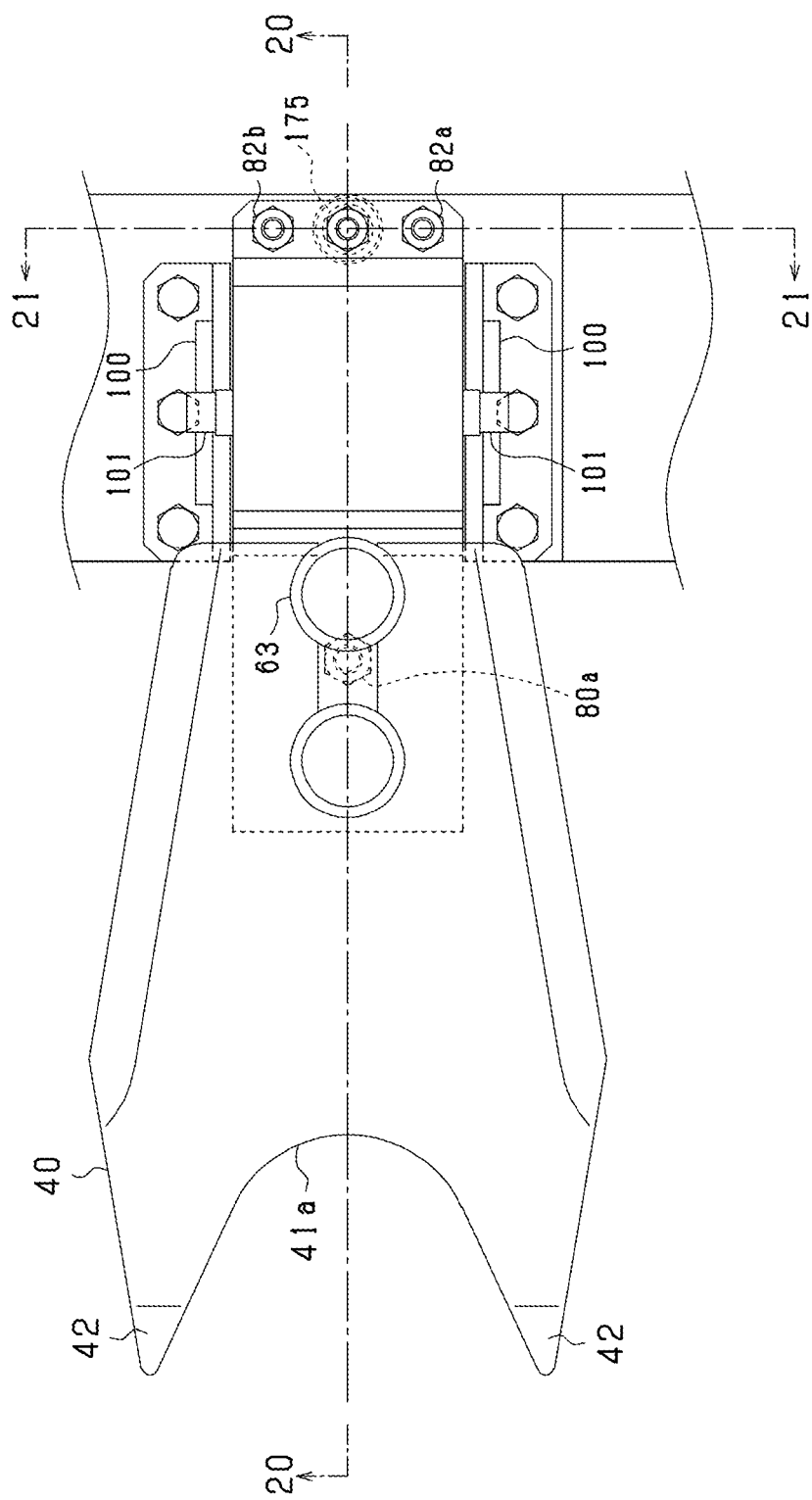
FIG. 19 is a plan view of a configuration on the second shear blade side of a cutting apparatus according to a fourth embodiment.
Figure 20:
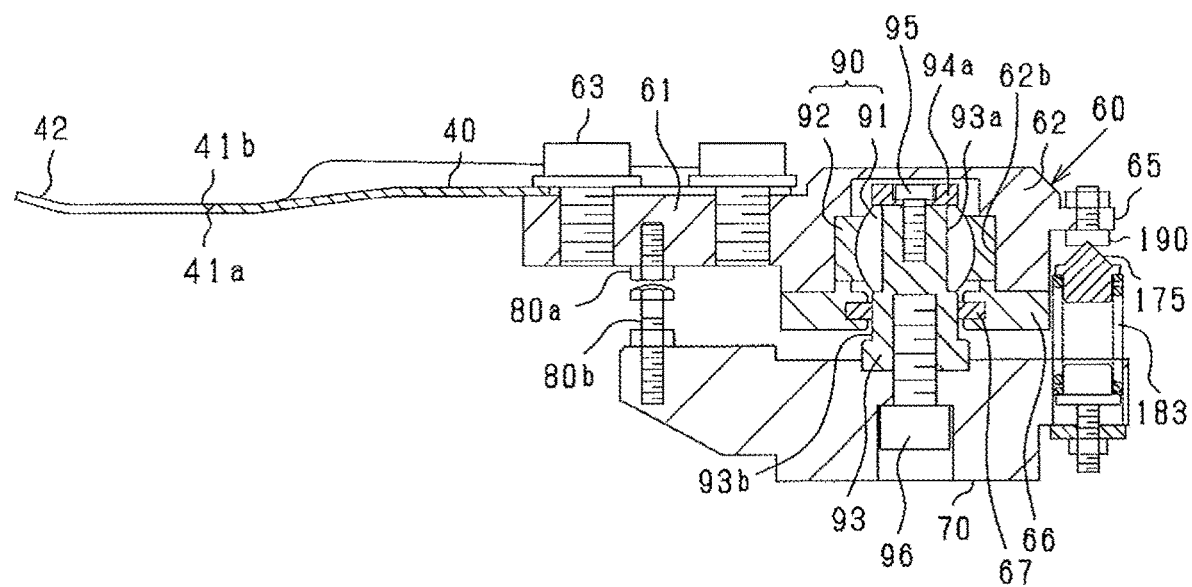
FIG. 20 is a cross-sectional view taken along a line 20-20 of FIG. 19.

The configuration of the second shear blade 40 side of the cutting apparatus is to be described with reference to FIGS. 19 to 21. Note that, in FIGS. 19 to 21, some of the same configurations as, or the corresponding configurations to those described in the second and third embodiments are designated by the same reference numerals for convenience.

In addition, some configurations are omitted to be shown in some drawings for convenience.

Figure 21:
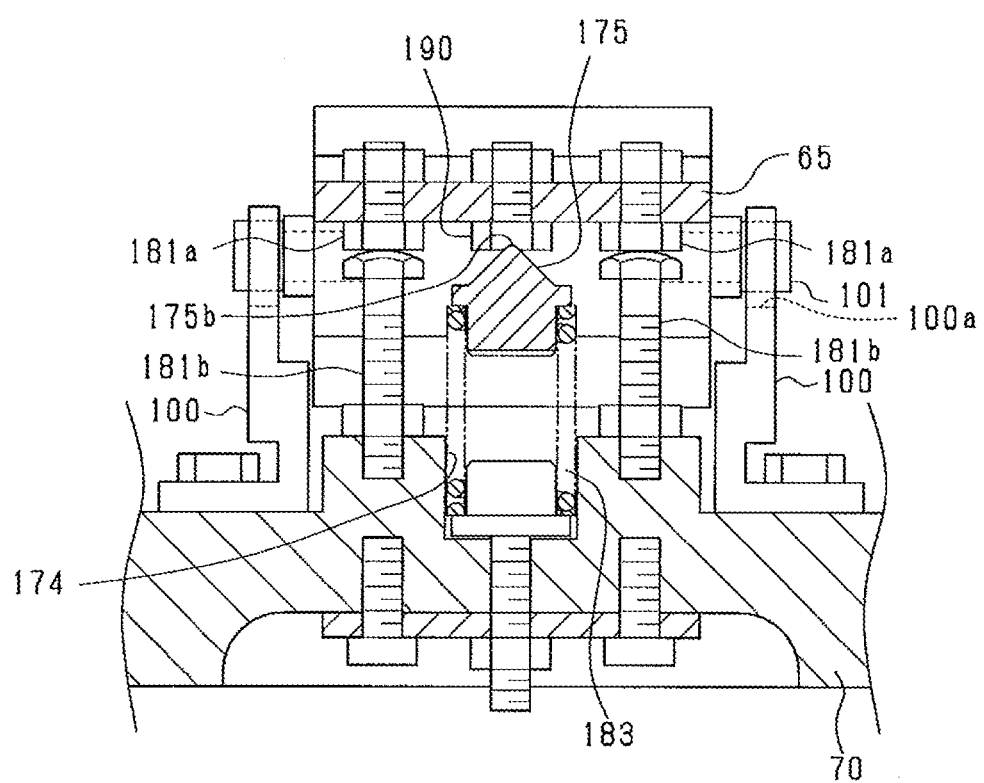
FIG. 21 is a cross-sectional view taken along a line 21-21 of FIG. 19.

As shown in FIG. 21, the cutting apparatus includes a contact portion 190. The contact portion 190 is provided at the center of the lower surface of the extending portion 65 in the width direction of the second shear blade 40. The contact portion 190 projects downward from the lower surface of the extending portion 65. In this embodiment, the contact portion 190 is formed from a bolt. The tip part of the upper portion of the spring receiving portion 175 is in contact with the contact portion 190. The head of the bolt, which is the contact portion 190, may be have formed therein a concave portion with which the convex portion 175b of the spring receiving portion 175 is in contact.

According to this embodiment described above, the same effect as that of the third embodiment can be obtained.

Other Embodiments

Each of the above embodiments may be modified for implementation as follows.

Any one of the first upper stopper portion 80a and the first lower stopper portion 80b may be omitted from the cutting apparatus. In this case, the height dimension of any one of the first upper stopper portion 80a and the first lower stopper portion 80b only needs to be adjusted so that the inclined portions of the first and second projecting portions 32 and 42 face each other in the horizontal direction when the first and second shear blades 30 and 40 are separated from each other.

In the first and second embodiments, any one of the second upper stopper portion 81a and the second lower stopper portion 81b may be omitted from the cutting apparatus. In this case, the height dimension of any one of the second upper stopper portion 81a and the second lower stopper portion 81b only needs to be adjusted so that the tip parts of the first and second shear blades 30 and 40 do not separate in the vertical direction when the tip parts of the first and second shear blades 30 and 40 overlap.

In the third embodiment, a concave portion with which the convex portion 175b is in contact may be formed, on the lower surface of the extending portion 65, instead of providing the contact portion 74.

In the third embodiment, a convex portion may be formed on the contact portion 74, and a concave portion with which the convex portion is in contact may be formed on the upper end part of the spring receiving portion 175.

The configuration for applying the elastic force to the mounting portion 60 is not limited to the one illustrated in each of the above embodiments. For example, in a state in which the first upper stopper portion 80a is in contact with the first lower stopper portion 80b, a spring may be attached to an upper part of the extending portion 65 so that an elastic force for pulling the extending portion 65 upward is applied to the extending portion 65.

In each of the above embodiments, when the tip parts of the first and second shear blades 30 and 40 overlap, the second shear blade 40 is arranged so as to be above the first shear blade 30, but the present invention is not limited to this. The first shear blade 30 may be arranged so as to be above the second shear blade 40. In this case, the first projecting portion 32 only needs to be inclined obliquely upward and the second projecting portion 42 only needs to be inclined obliquely downward. In addition, the molten glass cutting apparatus only needs to be configured such that an elastic force in a specific direction around the first axis for pressing the second shear blade 40 against the first shear blade 30 is applied to the mounting portion 60.

In each of the above embodiments, the configuration for rotatably supporting the shear blade around the first and second axes is integrated on the second shear blade 40 side, but the present invention is not limited to this. For example, the first and second shear blades 33 and 40 may be configured such that: the base end part of the second shear blade 40 is provided with a configuration that rotatably supports the second shear blade 43 with respect to the second base portion 70 around the first axis; and the base end part of the first shear blade 30 may be provided with a configuration that rotatably supports the first shear blade 30 with respect to the first base portion 50 around the second axis. In this case, the first shear blade 30 side only needs to have a configuration such that an elastic force around the second axis is applied to the first shear blade 30 so that the respective cutting edge sides of the first and second shear blades 30 and 40 are placed along each other.

The invention claimed is:

1. A molten glass cutting apparatus, comprising:
   a pair of shear blades;
   base portions each provided for a base end part of each of a pair of the shear blades,
   wherein a pair of the base portions are relatively moved toward each other so that tip parts of a pair of the shear blades overlap, and a shearing force by cutting edges of a pair of the shear blades cuts molten glass falling from above,
   each of a pair of the shear blades having projecting portions formed therein on both sides in a width direction and on a cutting edge side, the projecting portions each projecting in a length direction of the shear blade,
   the projecting portions of each of a pair of the shear blades being inclined in a direction opposite to a side where the tip parts overlap so that each projecting portions serves as a guide when the tip parts of a pair of the shear blades overlap by the relative movement toward each other;
   a first support portion provided at the base end part of one of a pair of the shear blades, the first support portion supporting the shear blade with respect to the base portion so as to be rotatable around a first axis extending in the width direction of the shear blade;
   a second support portion provided at the base end part of one of a pair of the shear blades, the second support portion supporting the shear blade with respect to the base portion so as to be rotatable around a second axis extending in the length direction of the shear blade;
   a restriction portion that restricts rotation of the shear blade provided with the first support portion around the first axis so that inclined portions of the projecting portions of each of a pair of the shear blades face each other when a pair of the shear blades are separated; and
   an applying portion that applies an elastic force around the first axis for pressing a pair of the shear blades against each other to the shear blade provided with the first support portion.

2. The molten glass cutting apparatus according to claim 1, wherein the first support portion, the second support portion, and the applying portion are integrally provided on one of a pair of the shear blades.

3. The molten glass cutting apparatus according to claim 2, wherein, of a pair of the shear blades, a shear blade provided with the first support portion and the second support portion is arranged so as to be above another shear blade when the tip parts of a pair of the shear blades overlap.

4. The molten glass cutting apparatus according to claim 3, comprising:
as the first support portion and the second support portion,
a mounting portion attached to the base end part of the shear blade, and
a rotating portion, attached to the mounting portion, for rotatably supporting the shear blade with respect to the base portion around the first axis and the second axis; and
as the applying portion,
a spring that applies an elastic three in a direction around the first axis to a central part of the mounting portion in the width direction of the shear blade.

5. The molten glass cutting apparatus according to claim 4, wherein
a lower end of the spring is supported by the base portion, and
the molten glass cutting apparatus comprises, as the applying portion,
a spring receiving portion having a seat surface formed therein with which an upper end of the spring is in contact, and
wherein a convex portion is formed on one side and a concave portion with which the convex portion is in contact is formed on another side, the one side and the other side being one of: a central part in the width direction of the rotating portion or the mounting portion; and the upper end part of the spring receiving portion, and
a dimension in a width direction of the convex portion is smaller than an outer diameter dimension of the spring.

6. The molten glass cutting apparatus according to claim 1, wherein
the applying portion comprises a first applying portion, and
the molten glass cutting apparatus comprises
a second applying portion that applies an elastic force to the shear blade provided with the second support portion, the elastic force being an elastic force around the second axis for placing the respective cutting edge sides of a pair of the shear blades along each other.

7. The molten glass cutting apparatus according to claim 6, wherein the first support portion, the second support portion, the first applying portion, and the second applying portion are integrally provided on one of a pair of the shear blades.

8. The molten glass cutting apparatus according to claim 7, wherein, of a pair of the shear blades, the shear blade provided with the first support portion and the second support portion is arranged so as to be above the other shear blade when the tip parts of a pair of shear blades overlap.

9. The molten glass cutting apparatus according to claim 8, comprising:
as the first support portion and the second support portion,
a mounting portion attached to the base end part of the shear blade, and
a rotating portion, attached to the mounting portion, for rotatably supporting the shear blade with respect to the base portion around the first axis and the second axis; and
as the first applying portion and the second applying portion,
a first spring that applies an elastic force in a direction around the first axis to a part of the mounting portion, the part of the mounting portion being offset to one side in the width direction with respect to a center of the shear blade in the width direction, and
a second spring that applies an elastic force in a direction around the first axis to a part of the mounting portion, the part of the mounting portion being offset to another side in the width direction with respect to the center of the shear blade in the width direction.

10. The molten glass cutting apparatus according to claim 4 or 9, wherein
the restriction portion comprises a first restriction portion, and
the molten glass cutting apparatus comprises
a second restriction portion that restricts rotation around the first axis of the shear blade so that the tip parts of a pair of the shear blades do not separate in the vertical direction when the tip parts of a pair of the shear blades overlap due to relative movement of a pair of the base portions, the shear blade having the mounting portion attached thereto.

11. The molten glass cutting apparatus according to claim 10, wherein
the rotating portion includes:
a shaft support portion fixed to the base portion and extending upward from the base portion;
a first rotating shaft extending in a direction of the first axis and rotatably supported by the shaft support portion around the first axis; and
a second rotating shaft extending from an intermediate part of the first rotating shaft in a direction of the second axis, the second rotating shaft rotatably supporting the mounting portion around the second axis with respect to the shaft support portion.

12. The molten glass cutting apparatus according to claim 10, wherein
the rotating portion includes:
a support shaft fixed to the base portion and extending upward from the base portion; and
a spherical plain bearing having an inner ring and an outer ring, the inner ring being fixed to the support shaft and having a spherical outer peripheral surface formed therein, the outer ring having formed therein a concave surface corresponding to the outer peripheral surface and being attached to the mounting portion.

13. The molten glass cutting apparatus according to claim 4, or 9, wherein
the rotating portion includes:
a shaft support portion fixed to the base portion and extending upward from the base portion;
a first rotating shaft extending in a direction of the first axis and rotatably supported by the shaft support portion around the first axis; and
a second rotating shaft extending from an intermediate part of the first rotating shaft in a direction of the second axis, the second rotating shaft rotatably supporting the mounting portion around the second axis with respect to the shaft support portion.

14. The molten glass cutting apparatus according to claim 4 or 9, wherein
the rotating portion includes:
a support shaft fixed to the base portion and extending upward from the base portion; and a spherical plain bearing having an inner ring and an outer ring, the inner ring being fixed to the support shaft and having a spherical outer peripheral surface formed therein, the outer ring having formed therein a concave surface corresponding to the outer peripheral surface and being attached to the mounting portion.

* * * * *